US012802979B2

(12) United States Patent
Nagao

(10) Patent No.: US 12,802,979 B2
(45) Date of Patent: Nov. 17, 2026

(54) # LITHIUM-METAL COMPOSITE OXIDE, POSITIVE ELECTRODE ACTIVE MATERIAL FOR LITHIUM SECONDARY BATTERY, POSITIVE ELECTRODE FOR LITHIUM SECONDARY BATTERY, AND LITHIUM SECONDARY BATTERY

(71) Applicant: Sumitomo Metal Mining Co., Ltd., Tokyo (JP)

(72) Inventor: Daisuke Nagao, Niihama (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 974 days.

(21) Appl. No.: 17/922,822

(22) PCT Filed: Apr. 27, 2021

(86) PCT No.: PCT/JP2021/016782
§ 371 (c)(1),
(2) Date: Nov. 2, 2022

(87) PCT Pub. No.: WO2021/225095
PCT Pub. Date: Nov. 11, 2021

(65) Prior Publication Data
US 2023/0163294 A1 May 25, 2023

(30) Foreign Application Priority Data
May 7, 2020 (JP) ................................ 2020-082109

(51) Int. Cl.
*H01M 4/525* (2010.01)
*C01G 53/506* (2025.01)
(Continued)

(52) U.S. Cl.
CPC .......... *H01M 4/525* (2013.01); *C01G 53/506* (2025.01); *C01G 53/84* (2025.01); *H01M 4/485* (2013.01);
(Continued)

(58) Field of Classification Search
CPC ...... H01M 4/525; H01M 4/505; H01M 4/485; H01M 2004/021; H01M 2004/028
(Continued)

(56) References Cited

U.S. PATENT DOCUMENTS 10,535,875 B2 1/2020 Takamori et al.
2015/0188136 A1 7/2015 Mori et al.
(Continued)

FOREIGN PATENT DOCUMENTS

CN 107078293 A 8/2017
JP 6630865 B1 1/2020
(Continued)

OTHER PUBLICATIONS

Extended European Search Report issued in the corresponding European patent Application No. 21800161.8 dated May 21, 2024.
(Continued)

*Primary Examiner* — Kevin P Kerns
(74) *Attorney, Agent, or Firm* — Rimon P.C.

(57) ABSTRACT

A lithium metal composite oxide having a layered structure, containing at least Li, Ni, and an element X, in which the element X is one or more elements selected from the group consisting of Co, Mn, Mg, Ca, Sr, Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn, $L/D_{50}$ that is a ratio of an average primary particle diameter L to a 50% cumulative volume particle size $D_{50}$ is 0.3 to 1.5, and, in powder X-ray diffrac-
(Continued)

tion measurement using a CuKα ray, a crystallite diameter A calculated from a diffraction peak within a range of 2θ=44.5±1° is 700 Å or less.

16 Claims, 2 Drawing Sheets

(51) Int. Cl.

| | |
|---|---|
| ***C01G 53/84*** | (2025.01) |
| ***H01M 4/485*** | (2010.01) |
| ***H01M 4/505*** | (2010.01) |
| ***H01M 10/052*** | (2010.01) |
| *H01M 4/02* | (2006.01) |

(52) U.S. Cl.
CPC ......... *H01M 4/505* (2013.01); *H01M 10/052* (2013.01); *H01M 2004/021* (2013.01); *H01M 2004/028* (2013.01)

(58) Field of Classification Search
USPC .............................. 429/218.1, 231.9, 231.95
See application file for complete search history.

(56) References Cited

U.S. PATENT DOCUMENTS

| | | | |
|---|---|---|---|
| 2016/0172674 | A1 | 6/2016 | Oda et al. |
| 2016/0372749 | A1 | 12/2016 | Iida et al. |
| 2017/0187031 | A1 | 6/2017 | Kurita et al. |
| 2017/0237069 | A1 | 8/2017 | Takamori et al. |
| 2017/0288223 | A1 | 10/2017 | Ogawa et al. |
| 2019/0051900 | A1 | 2/2019 | Yamaguchi et al. |
| 2019/0319257 | A1 | 10/2019 | Ogawa et al. |
| 2021/0013506 | A1 | 1/2021 | Takamori et al. |
| 2021/0111404 | A1 | 4/2021 | Kondo et al. |
| 2021/0265627 | A1 | 8/2021 | Hiratsuka |
| 2022/0204360 | A1 | 6/2022 | Nagao |

FOREIGN PATENT DOCUMENTS

| | | | |
|---|---|---|---|
| KR | 10-2017-0009876 | A | 1/2017 |
| WO | 2014/010448 | A1 | 1/2014 |
| WO | 2014/192759 | A1 | 12/2014 |
| WO | 2015/012283 | A1 | 1/2015 |
| WO | 2017/150504 | A1 | 9/2017 |
| WO | 2018/088320 | A1 | 5/2018 |
| WO | 2019/177023 | A1 | 9/2019 |
| WO | 2019/194150 | A1 | 10/2019 |
| WO | 2020/003642 | A1 | 1/2020 |

OTHER PUBLICATIONS

International Search Report issued in corresponding International Patent Application No. PCT/JP2021/016782, dated Jul. 13, 2021, with English translation.
Office Action received in corresponding Korean Patent Application No. 10-2022-7038325, dated Feb. 2, 2026.

LITHIUM-METAL COMPOSITE OXIDE, POSITIVE ELECTRODE ACTIVE MATERIAL FOR LITHIUM SECONDARY BATTERY, POSITIVE ELECTRODE FOR LITHIUM SECONDARY BATTERY, AND LITHIUM SECONDARY BATTERY

CROSS REFERENCE TO RELATED APPLICATIONS

This application is the U.S. National Phase under 35 U.S.C. § 371 of International Application No. PCT/JP2021/016782, filed on Apr. 27, 2021, which claims the benefit of Japanese Application No. 2020-082109, filed on May 7, 2020, the entire contents of each are hereby incorporated by reference.

TECHNICAL FIELD

The present invention relates to a lithium metal composite oxide, a positive electrode active material for a lithium secondary battery, a positive electrode for a lithium secondary battery, and a lithium secondary battery.

BACKGROUND ART

Lithium metal composite oxides are being used as positive electrode active materials for lithium secondary batteries. Attempts of putting lithium secondary batteries into practical use not only for small-sized power sources in mobile phone applications, notebook personal computer applications, and the like but also for medium-sized or large-sized power sources in automotive applications, power storage applications, and the like have already been underway.

The crystal structure of a lithium metal composite oxide is involved in the desorption of lithium from a positive electrode during charging and the intercalation of lithium during discharging. In order to improve the battery characteristics of lithium secondary batteries, attempts of controlling the crystal structure of a positive electrode active material for a lithium secondary battery is underway.

For example, Patent Document 1 aims to provide a positive electrode active material having a favorable initial charging and discharging efficiency and favorable rate characteristics of a lithium secondary battery and describes a lithium nickel composite oxide for which a crystallite diameter that is calculated from the peak of a (003) plane is 50 to 300 nm.

CITATION LIST

Patent Document

[Patent Document 1]
WO 2014/010448A1

SUMMARY OF INVENTION

Technical Problem

In order to further improve battery characteristics such as the cycle retention rate, there is still room for improvement in lithium metal composite oxides.

The present invention has been made in view of the above-described circumstances, and an object of the present invention is to provide a lithium metal composite oxide capable of achieving a high cycle retention rate when used as a positive electrode active material for a lithium secondary battery and a positive electrode active material for a lithium secondary battery, a positive electrode for a lithium secondary battery, and a lithium secondary battery in which the lithium metal composite oxide is used.

Solution to Problem

The present invention has the following aspects.

[1] A lithium metal composite oxide having a layered structure, containing at least Li, Ni, and an element X, in which the element X is one or more elements selected from the group consisting of Co, Mn, Mg, Ca, Sr, Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn, $L/D_{50}$ that is a ratio of an average primary particle diameter L to a 50% cumulative volume particle size $D_{50}$ is 0.3 to 1.5, and, in powder X-ray diffraction measurement using a CuKα ray, a crystallite diameter A calculated from a diffraction peak within a range of $2\theta=44.5\pm1°$ is 700 Å or less.

[2] The lithium metal composite oxide according to [1], in which $L/D_{10}$ that is a ratio of the average primary particle diameter L to a 10% cumulative volume particle size $D_{10}$ is 0.6 to 3.

[3] The lithium metal composite oxide according to [1] or [2], in which the average primary particle diameter L is 1 to 10 μm.

[4] The lithium metal composite oxide according to any one of [1] to [3], in which the 50% cumulative volume particle size $D_{50}$ is 2 to 25 μm.

[5] The lithium metal composite oxide according to any one of [1] to [4], in which a BET specific surface area is 0.3 to 1.9 $m^2/g$.

[6] The lithium metal composite oxide according to any one of [1] to [5], in which, in the powder X-ray diffraction measurement using a CuKα ray, when a crystallite diameter calculated from a diffraction peak within a range of $2\theta=18.5\pm1°$ is indicated by B, B/A that is a ratio of the crystallite diameter B to the crystallite diameter A is 1.3 to 1.78.

[7] The lithium metal composite oxide according to [6], in which the crystallite diameter B is 1300 Å or less.

[8] The lithium metal composite oxide according to any one of [1] to [7] that is represented by a composition formula (I).

$$Li[Li_x(Ni_{(1-y-z-w)}Co_yMn_zX1_w)_{1-x}]O_2 \quad (I)$$

In the formula (I), X1 represents one or more elements selected from the group consisting of Mg, Ca, Sr, Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn, and $-0.1\leq x\leq0.2$, $0\leq y\leq0.4$, $0\leq z\leq0.4$, $0\leq w\leq0.1$, and $0<y+z+w$ are satisfied.

[9] The lithium metal composite oxide according to [8], in which x in the composition formula (I) satisfies $0<x\leq0.2$.

[10] The lithium metal composite oxide according to [8] or [9], in which the composition formula (I) satisfies $0<y+z+w\leq0.3$.

[11] A positive electrode active material for a lithium secondary battery, containing the lithium metal composite oxide according to any one of [1] to [10].

[12] A positive electrode for a lithium secondary battery, containing the positive electrode active material for a lithium secondary battery according to [11].

[13] A lithium secondary battery having the positive electrode for a lithium secondary battery according to [12].

Advantageous Effects of Invention

According to the present invention, it is possible to provide a lithium metal composite oxide capable of achieving a high cycle retention rate when used as a positive electrode active material for a lithium secondary battery and a positive electrode active material for a lithium secondary battery, a positive electrode for a lithium secondary battery, and a lithium secondary battery in which the lithium metal composite oxide is used.

DESCRIPTION OF EMBODIMENTS

Figure 1:
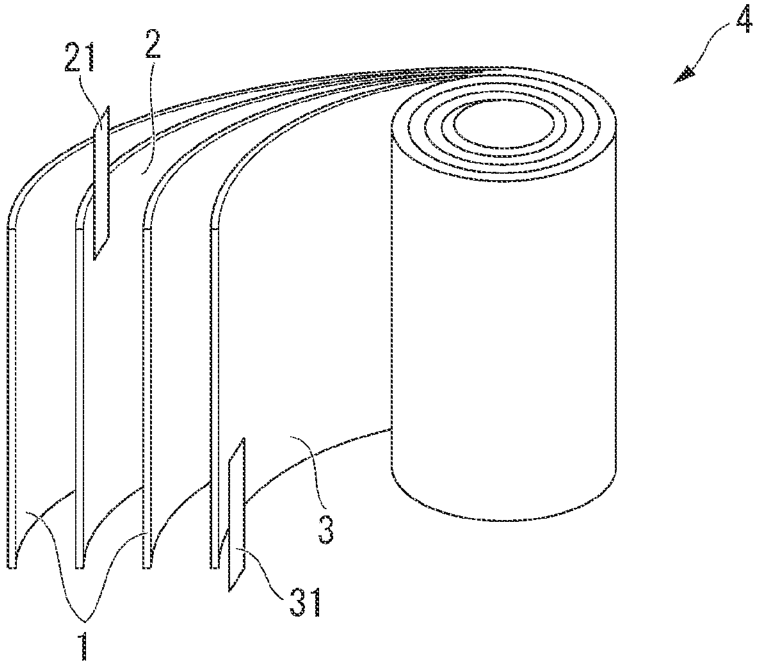
FIG. 1 is a schematic configuration view showing an example of a lithium secondary battery.

Hereinafter, a lithium metal composite oxide in an aspect of the present invention, a positive electrode active material for a lithium secondary battery, a positive electrode for a lithium secondary battery, and a lithium secondary battery, in which the lithium metal composite oxide is used, will be described. In a plurality of embodiments to be described below, preferable examples or conditions may be shared.

In the present specification, a lithium metal composite oxide will be hereinafter referred to as "LiMO", and a positive electrode (cathode) active material for lithium secondary batteries will be hereinafter referred to as "CAM".

"Ni" refers not to a nickel metal but to a nickel atom, and "Co", "Mn", "Zr", "Li", and the like also, similarly, each refer to a cobalt atom, a manganese atom, a zirconium atom, a lithium atom, or the like.

In a case where a numerical range is expressed as, for example, "1 to 10 μm" or "1 to 10 μm", this means a range from 1 μm to 10 μm and means a numerical range including 1 μm, which is the lower limit value, and 10 μm, which is the upper limit value.

In the present embodiment. "primary particle" means a particle in which, apparently, no grain boundary is present at the time of observing the particle in a visual field of 5000 times or more and 20000 times or less using a scanning electron microscope or the like.

In the present embodiment, "secondary particle" is a particle in which the primary particles aggregate. That is, a secondary particle is an aggregate of primary particles.

In the present embodiment, "average primary particle diameter" is measured as described below. First, using a scanning electron microscope (SEM, for example, JSM-5510 manufactured by JEO. Ltd.), an object to be measured is irradiated with electron beams at an acceleration voltage of 20 kV, and SEM observation is carried out. At that time, the magnification is set so that the obtained image (that is, a SEM photograph) includes 50 or more and 100 or less primary particles. As an example, the magnification may be 1000 times or more and 30000 times or less. For each primary particle in the SEM photograph, a rectangle circumscribed by the primary particle is assumed, and the dimension of the rectangle in the longitudinal direction is regarded as the primary particle diameter. The dimensions are measured for the individual primary particles in the SEM photograph, and the average value thereof is regarded as the average primary particle diameter.

"Crystallite diameter" can be calculated by using CuKα as a radiation source and carrying out powder X-ray diffraction measurement within a measurement range of the diffraction angle 2θ set to 10° or more and 90° or less. For example, a crystallite diameter B calculated from a diffraction peak within a range of $2\theta=18.5\pm1°$ can be calculated by calculating the half width of a diffraction peak within the range of $2\theta=18.5\pm1°$ and using the Scherrer equation $L=K\lambda/\beta \cos\theta$ (L: crystallite diameter, K: Scherrer constant, β: peak half width). A crystallite diameter A calculated from a diffraction peak within a range of $2\theta=44.5\pm1°$ can be calculated by calculating the half width of a diffraction peak within the range of $2\theta=44.5\pm1°$ and using the Scherrer equation.

The powder X-ray diffraction measurement can be carried out with an X-ray diffractometer (for example, Ultima IV manufactured by Rigaku Co., Ltd.). Detailed conditions will be described in examples. The half width of a diffraction peak can be calculated by analyzing a powder X-ray diffraction pattern that is obtained by the powder X-ray diffraction measurement with analysis software (for example, integrated powder X-ray analysis software JADE).

"BET specific surface area" is a value that is measured by the Brunauer, Emmet, and Teller (BET) method. Nitrogen gas is used as the adsorbed gas in the measurement of the BET specific surface area. For example, the BET specific surface area (unit: $m^2/g$) can be measured using a BET specific surface area meter (for example, Macsorb (registered trademark) manufactured by Mountech Co., Ltd.) after drying 1 g of a powder to be measured in a nitrogen atmosphere at 105 °C for 30 minutes.

"Cumulative volume particle size" is measured by the laser diffraction scattering method. Specifically, an object to be measured, for example, 0.1 g of a LiMO powder is injected into 50 ml of a 0.2 mass % sodium hexametaphosphate aqueous solution to obtain a dispersion liquid in which the powder is dispersed. Next, the particle size distribution of the obtained dispersion liquid is measured using a laser diffraction scattering particle size distribution measuring device (for example, MASTERSIZER 2000 manufactured by Malvern Panalytical Ltd.) to obtain a volume-based cumulative particle size distribution curve.

In the obtained cumulative particle size distribution curve, the value of the particle size at the time of 10% cumulation from the fine particle side is the 10% cumulative volume particle size $D_{10}$ (μm), and the value of the particle size at the time of 50% cumulation from the fine particle side is the 50% cumulative volume particle size $D_{50}$ (μm).

"Cycle retention rate" means a ratio of the discharge capacity of a lithium secondary battery that has been charged and discharged repeatedly to the initial discharge capacity of the lithium secondary battery after carrying out a cycle test in which the lithium secondary battery is charged and discharged repeatedly a predetermined number of times under specific conditions.

In the present specification, a value measured after carrying out a test is regarded as the cycle retention rate, and, in the test, a charging and discharging cycle of a lithium secondary battery produced by a method described in <Production of lithium secondary battery (coin-type half cell)> to be described below is repeated 50 times under conditions to be described below.

Test temperature: 25 °C

Maximum charging voltage: 4.35 V, charging current: 0.5 CA, constant current constant voltage charging Minimum discharging voltage: 2.8 V, discharging current: 1 CA, constant current discharging The discharge capacity in the first cycle is regarded as the cycle initial capacity, a value obtained by dividing the discharge capacity in the $50^{th}$ cycle by the cycle initial capacity is calculated, and this value is regarded as the cycle retention rate.

LiMO

LiMO of the present embodiment is LiMO having a layered structure and containing at least Li, Ni, and an element X, in which the element X is one or more elements selected from the group consisting of Co, Mn, Mg, Ca, Sr, Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn, $L/D_{50}$ that is the ratio of the average primary particle diameter IL to the 50% cumulative volume particle size $D_{50}$ is 0.3 to 1.5, and, in powder X-ray diffraction measurement using a CuKα ray, the crystallite diameter A calculated from a diffraction peak within a range of $2\theta=44.5\pm1°$ is 700 Å or less.

In one aspect of the present invention, LiMO is composed of primary particles alone.

In one aspect of the present invention, LiMO is composed of secondary particles that are aggregates of primary particles and primary particles that are present independently of the secondary particles.

In one aspect of the present invention, LiMO is a powder.

In a case where LiMO is composed of secondary particles, which are aggregates of primary particles, and primary particles that are present independently of the secondary particles, the proportion of the number of the primary particles in the total of the number of the secondary particles and the number of the primary particles in LiMO is preferably 20% or more, more preferably 30% or more, and particularly preferably 50% or more. The upper limit thereof is not particularly limited, but is less than 100% and preferably 90% or less.

In the calculation of the number of the primary particles, primary particles that configure the secondary particles are not counted, and only the number of primary particles that are present independently of the secondary particles is counted.

In the present embodiment, the proportion of the number of the primary particles in the total of the number of the secondary particles and the number of the primary particles in LiMO is obtained by the following method. First, LiMO is placed on a conductive sheet attached onto a sample stage, and the primary particles and the secondary particles, which are aggregates of the primary particles, are dispersed so as to be present independently without being in contact with each other.

After that, using a SEM (for example, JSM-5510 manufactured by JEOL Ltd.), the particles are irradiated with electron beams at an acceleration voltage of 20 kV, and SEM observation is carried out. Next, all particles in the SEM photograph are regarded as the total of the number of the secondary particles and the number of the primary particles.

Next, the number of the primary particles that are included in all of the particles and present independently of the secondary particles is calculated. The obtained number of the primary particles is divided by the total of the number of the secondary particles and the number of the primary particles, thereby calculating the proportion of the number of the primary particles in the total of the number of the secondary particles and the number of the primary particles. The magnification of the SEM photograph is adjusted to a magnification at which 200 or more and 400 or less LiMO particles, which are the object, are present in the SEM photograph. As an example, the magnification may be 1000 or more and 30000 times or less.

In a case where the proportion of the secondary particles in LiMO is high, for example, in a case where the proportion of the number of the primary particles contained in LiMO is 50% or less, the $L/D_{50}$ of LiMO is less than 1. That is, the proportion of the number of the secondary particles is large, and $D_{50}$ is affected by the particle diameters of the secondary particles. As the particle diameters of the secondary particles become larger, the $L/D_{50}$ becomes a smaller value. In the present embodiment, the $L/D_{50}$ is 0.3 or more. When the $L/D_{50}$ is 0.3 or more, the particle diameters of the secondary particles are not too large. Therefore, even when a lithium secondary battery is repeatedly charged and discharged, and the primary particles of LiMO expand or contract due to the desorption reaction and absorption reaction of lithium ions, particle interfaces between the primary particles of LiMO are less likely to crack.

In a case where the proportion of the primary particles in LiMO is high, for example, in a case where the proportion of the number of the primary particles contained in LiMO is 80% or more, the $L/D_{50}$ of LiMO is 1 or more.

As described above, the primary particle diameter of LiMO is, when a rectangle that is circumscribed by a primary particle observed in a SEM photograph is assumed, the dimension of the rectangle in the longitudinal direction. At this time, it is also conceivable that, for some particles, the ratio of dimensions in the longitudinal direction to the lateral direction (hereinafter, also referred to as the aspect ratio) is large. A primary particle having a large aspect ratio is evaluated to have a large primary particle diameter compared with a primary particle having the same area but having a small aspect ratio in a SEM photograph. For example, The primary particle diameter of a primary particle P having an aspect ratio of 2 is assumed to be 2 and the area in a SEM photograph is assumed to be 2. On the other hand, the primary particle diameter of a primary particle Q having a truly circular shape (that is, the diameter of a true circle) and having an area of 2 in the SEM photograph is about 1.60.

Here, the $D_{50}$ that is obtained by cumulative volume particle size measurement is calculated on the assumption that a particle to be measured is a true sphere. That is, when the aspect ratio of the primary particle becomes large, the $D_{50}$ is calculated as a smaller value than the primary particle diameter. When the previous example is used for description, if the $D_{50}$ that is obtained by the cumulative volume particle size measurement of the primary particle P is assumed to be a value close to 1.60, which is the primary particle diameter of the primary particle Q, the $L/D_{50}$ of the primary particle P becomes 1.25.

That is, in LiMO, when the proportion of the primary particles is large, and a number of the primary particles having a large aspect ratio are contained, the $L/D_{50}$ becomes a larger value. In LiMO, when the proportion of the primary particles is large, and a number of the primary particles having a large aspect ratio are contained, the $L/D_{50}$ becomes a value close to 1. The $L/D_{50}$ in the present embodiment is 1.5 or less. When the $L/D_{50}$ is 1.5 or less, the aspect ratios of the primary particles are not too large.

Therefore, when LiMO is used as CAM, the filling property of CAM becomes favorable, and the density of a positive electrode for a lithium secondary battery to be obtained can be improved. As a result, it is possible to improve the volume capacity of the lithium secondary battery.

In a case where the proportion of the number of the primary particles in LiMO is more than 50% and less than 80%, a value of $L/D_{50}=1\pm0.5$ can be acquired depending on the aspect ratios of the primary particles or the particle diameters of the secondary particles.

In view of the above description, the $L/D_{50}$ of LiMO of the present embodiment is 0.3 to 1.5, preferably 0.30 to 1.2, more preferably 0.30 to 1.0, and still more preferably 0.4 to 1.0. In a case where the $L/D_{50}$ is 0.3 to 1.5, even when a lithium secondary battery in which LiMO is used as CAM is repeatedly charged and discharged, and the primary particles of LiMO expand or contract due to the desorption reaction and absorption reaction of lithium ions, particle interfaces between the primary particles of LiMO are less likely to crack. In addition, when the $L/D_{50}$ is 1.5 or less, the aspect ratios of the primary particles are not too large, and the primary particles of LiMO uniformly expand and contract during the absorption reaction and desorption reaction of lithium ions. Therefore, in a case where cyclic charging and discharging has been carried out, voids are less likely to be generated between LiMO and a conductive material, and a favorable contact state can be maintained. As a result, it is possible to increase the cycle retention rate of the lithium secondary battery.

The average primary particle diameter L of LiMO is preferably 1 to 10 μm, more preferably 1.5 to 8 μm, still more preferably 1.7 to 6 μm, and particularly preferably 2 to 4.5 μm. When the average primary particle diameter L of LiMO is 1 to 10 μm, the proportion of the primary particles contained in LiMO is high. Therefore, even when a lithium secondary battery in which LiMO is used as CAM is repeatedly charged and discharged, and the primary particles of LiMO expand or contract due to the desorption reaction and absorption reaction of lithium ions, particle interfaces between the primary particles of LiMO are less likely to crack. As a result, it is possible to increase the cycle retention rate of the lithium secondary battery.

The 50% cumulative volume particle size $D_{50}$ of LiMO is preferably 2 to 25 μm, more preferably 2.5 to 23 μm, and still more preferably 3 to 20 μm. When the 50% cumulative volume particle size $D_{50}$ of LiMO is 2 to 25 μm, the primary particles are less likely to aggregate to form secondary particles even in a case where the proportion of the primary particles contained in LiMO is high. Therefore, even when a lithium secondary battery is repeatedly charged and discharged, and the primary particles of LiMO expand or contract due to the desorption reaction and absorption reaction of lithium ions, particle interfaces between the primary particles are less likely to crack. As a result, it is possible to improve the cycle retention rate of the lithium secondary battery.

$L/D_{10}$, which is the ratio of the average primary particle diameter L of LiMO to the 10% cumulative volume particle size $D_{10}$ of LiMO, is preferably 0.6 to 3, more preferably 0.6 to 2.5, still more preferably 0.7 to 2.5, and particularly preferably 0.9 to 2. When the $L/D_{10}$ of LiMO is 0.63, the proportion of the primary particles in LiMO becomes dominant. Therefore, the use of CAM for which such LiMO is used makes the filling property of CAM favorable, improves the density of a positive electrode for a lithium secondary battery to be obtained and makes it possible to realize a favorable contact state between LiMO and a conductive material. As a result, it is possible to improve the cycle retention rate of the lithium secondary battery.

In the powder X-ray diffraction measurement of LiMO using CuKα rays, the crystallite diameter A calculated from a diffraction peak in a range of $2\theta=44.5\pm1°$ is 700 Å or less. The crystallite diameter A is preferably 680 Å or less, more preferably 670 Å or less, and still more preferably 650 Å or less. When the crystallite diameter A is 700 Å or less, since the migration path when lithium ions migrate inside a crystallite becomes short, it is possible to reduce resistance when the lithium ions migrate inside the crystallite. As a result, it is possible to increase the cycle retention rate of the lithium secondary battery.

The crystallite diameter A is preferably 450 Å or more, more preferably 480 Å or more, and still more preferably 510 Å or more. When the crystallite diameter A is 450 Å or more, since the interfaces between crystallites in the primary particles decrease, the frequency of lithium ions migrating between the crystallites decreases, and lithium ions migrate on the crystallite surface smoothly. As a result, it is possible to increase the cycle retention rate of the lithium secondary battery.

The upper limit value and lower limit value of the crystallite diameter A can be randomly combined together. For example, the crystallite diameter A is preferably 450 to 680 Å, more preferably 480 to 670 Å, and still more preferably 510 to 650 Å.

In the powder X-ray diffraction measurement of LiMO using CuKα rays, the crystallite diameter B calculated from a diffraction peak in a range of $2\theta=18.5\pm1°$ is the size of the crystallite in a (003) plane.

The crystallite diameter B is preferably 1300 Å or less, more preferably 1200 Å or less, and still more preferably 1150 Å or less. When the crystallite diameter B is 1300 Å or less, since the migration path when lithium ions migrate inside a crystallite becomes short, it is possible to reduce resistance when the lithium ions migrate inside the crystallite. As a result, it is possible to increase the cycle retention rate of the lithium secondary battery.

The crystallite diameter B is preferably 700 Å or more, more preferably 750 Å or more, and still more preferably 800 Å or more. When the crystallite diameter B is 700 Å or more, since the interfaces between crystallites in the particles decrease, the frequency of lithium ions migrating between the crystallites decreases, and lithium ions migrate on the crystallite surface smoothly. As a result, it is possible to increase the cycle retention rate of the lithium secondary battery.

The upper limit value and lower limit value of the crystallite diameter B can be randomly combined together. For example, the crystallite diameter B is preferably 700 to 1300 Å, more preferably 750 to 1200 Å, and still more preferably 800 to 1150 Å.

B/A, which is the ratio of the crystallite diameter B to the crystallite diameter A, is preferably 1.3 to 1.78, more preferably 1.33 to 1.78, still more preferably 1.33 to 1.75, and particularly preferably 1.35 to 1.7. When the B/A, which is the ratio of the crystallite diameter B to the crystallite diameter A, is 1.3 or more, the proportion of crystal growth in a (003) plane direction is large, and cracking between the crystallites is less likely to occur. As a result, it is possible to increase the cycle retention rate of the lithium secondary battery. When the B/A, which is the ratio of the crystallite diameter B to the crystallite diameter A, is 1.78 or less, since the isotropy of the crystallite is high, and crystal planes on which lithium ions are inserted and desorbed during charging and discharging are uniformly present in the entire LiMO, it is possible to increase the initial coulombic efficiency of lithium secondary batteries.

The BET specific surface area of LiMO is preferably 0.3 to 1.9 $m^2/g$, more preferably 0.4 to 1.5 $m^2/g$, and still more preferably 0.5 to 1.0 $m^2/g$. When the BET specific surface area of LiMO is 0.3 to 1.9 $m^2/g$, a reaction with an electrolytic solution on the surface of LiMO is suppressed. As a result, it is possible to increase the cycle retention rate of the lithium secondary battery.

LiMO is a metal oxide containing at least Li, Ni, and an element X and is represented by, for example, a composition formula (I).

$$Li[Li_x(Ni_{(1-y-z-w)}Co_yMn_zX1_w)_{1-x}]O_2 \quad (I)$$

In the formula (I), X1 represents one or more elements selected from the group consisting of Mg, Ca, Sr, Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn, and $-0.1 \leq x \leq 0.2$, $0 \leq y \leq 0.4$, $0 \leq z \leq 0.4$, $0 \leq w \leq 0.1$, and $0 < y+z+w$ are satisfied.

From the viewpoint of obtaining a lithium secondary battery having a high cycle retention rate, x in the composition formula (I) is −0.1 or more, more preferably −0.05 or more, and still more preferably more than 0. In addition, from the viewpoint of obtaining a lithium secondary battery having a higher initial coulombic efficiency, x in the composition formula (I) is 0.2 or less, preferably 0.08 or less, and more preferably 0.06 or less.

The upper limit value and lower limit value of x can be randomly combined together. As the combination, for example, x's of −0.1 to 0.2, more than 0 and 0.2 or less, −0.05 to 0.08, more than 0 and 0.06 or less, and the like are exemplary examples.

From the viewpoint of obtaining a lithium secondary battery having a low battery internal resistance, y in the composition formula (I) is 0 or more, preferably more than 0, more preferably 0.005 or more, and still more preferably 0.05 or more. y in the formula (I) is 0.4 or less, preferably 0.35 or less, more preferably 0.33 or less, and still more preferably 0.30 or less.

The upper limit value and lower limit value of y can be randomly combined together. y is 0 to 0.4, more preferably more than 0 and 0.35 or less, still more preferably 0.005 to 0.35, and particularly preferably 0.05 to 0.30.

From the viewpoint of obtaining a lithium secondary battery having a high cycle retention rate, z in the formula (I) is 0 or more, preferably 0.01 or more, more preferably 0.02 or more, and still more preferably 0.1 or more. In addition, z in the formula (I) is 0.4 or less, preferably 0.39 or less, more preferably 0.38 or less, and still more preferably 0.35 or less.

The upper limit value and lower limit value of z can be randomly combined together. z is 0 to 0.4, preferably 0.01 to 0.39, more preferably 0.02 to 0.38, and still more preferably 0.1 to 0.35.

From the viewpoint of obtaining a lithium secondary battery having a low battery internal resistance, w in the composition formula (I) is 0 or more, preferably more than 0, more preferably 0.0005 or more, and still more preferably 0.001 or more. In addition, from the viewpoint of obtaining a lithium secondary battery having a large discharge capacity at a high current rate, w in the composition formula (I) is 0.1 or less, preferably 0.09 or less, more preferably 0.08 or less, and still more preferably 0.07 or less.

The upper limit value and lower limit value of w can be randomly combined together. w is 0 to 0.01, preferably more than 0 and 0.09 or less, more preferably 0.0005 to 0.08, and still more preferably 0.001 to 0.07.

From the viewpoint of obtaining a lithium secondary battery having a high cycle retention rate, y+z+w is more than 0, preferably 0.01 or more, and more preferably 0.02 or more. From the viewpoint of obtaining a lithium secondary battery having high thermal stability, y+z+w is preferably 0.9 or less, more preferably 0.75 or less, and still more preferably 0.7 or less.

The upper limit value and lower limit value of y+z+w can be randomly combined together. y+z+w is preferably more than 0 and 0.9 or less, more preferably 0.01 to 0.5, and still more preferably 0.05 to 0.3.

From the viewpoint of obtaining a lithium secondary battery having a high cycle retention rate, X1 is preferably one or more metals selected from the group consisting of Ti, Mg, Al, W, B, Zr, and Nb and more preferably one or more metals selected from the group consisting of Al, W, B, Zr, and Nb.

The composition of LiMO can be analyzed, for example, using an inductively coupled plasma emission spectrometer (SPS3000 manufactured by Seiko Instruments Inc.) after LiMO is dissolved in hydrochloric acid.

In the present embodiment, the crystal structure of LiMO is a layered structure and more preferably a hexagonal crystal structure or a monoclinic crystal structure.

The hexagonal crystal structure belongs to any one space group selected from the group consisting of P3, $P3_1$, $P3_2$, R3, P-3, R-3, P312, P321, $P3_112$, $P3_121$, $P3_212$, $P3_221$, R32, P3m1, P31m, P3c1, P31c, R3m, R3c, P-31m, P-31c, P-3m1, P-3c1, R-3m, R-3c, P6, $P6_1$, $P6_5$, $P6_2$, $P6_4$, $P6_3$, P-6, P6/m, $P6_3/m$, P622, $P6_122$, $P6_522$, $P6_222$, $P6_422$, $P6_322$, P6 mm, P6cc, $P6_3cm$, $P6_3mc$, P-6m2, P-6c2, P-62m, P-62c, P6/mmm, P6/mcc, $P6_3/mcm$, and $P6_3/mmc$.

In addition, the monoclinic crystal structure belongs to any one space group selected from the group consisting of P2, $P2_1$, C2, Pm, Pc, Cm, Cc, P2/m, $P2_1/m$, C2/m, P2/c, $P2_1/c$, and C2/c.

Among these, in order to obtain a lithium secondary battery having a high discharge capacity, the crystal structure is particularly preferably a hexagonal crystal structure belonging to the space group R-3m or a monoclinic crystal structure belonging to C2/m.

In the present invention, the $L/D_{50}$ of LiMO is 0.3 to 1.5, and, in the powder X-ray diffraction measurement of LiMO using CuKα rays, the crystallite diameter A calculated from a diffraction peak within the range of $2\theta=44.5\pm10$ is 700 Å or less, whereby the cycle retention rate of a lithium secondary battery for which LiMO is used as CAM improves.

Production Method of LiMO

A production method of LiMO of the present embodiment is preferably a production method including the following (1), (2), and (3) in this order.

(1) Production of metal composite oxide
(2) Mixing of metal composite oxide and lithium compound
(3) Calcining of mixture of metal composite oxide and lithium compound Hereinafter. (1) to (3) will be described by taking a production method of LiMO containing Li, Ni, Co, and Mn as an example.

(1) Production of Metal Composite Oxide

As a precursor of a metal composite oxide, first, a metal composite hydroxide containing metal atoms other than Li, that is, Ni, Co, and Mn is prepared. Usually, the metal composite hydroxide can be produced by a well-known batch-type co-precipitation method or continuous co-precipitation method.

Specifically, a nickel salt solution, a cobalt salt solution, a manganese salt solution, and a complexing agent are reacted by the continuous co-precipitation method described in JP-A-2002-201028, thereby producing a metal composite hydroxide represented by $Ni_{1-y-z)}Co_yMn_z(OH)_2$ (in the example of this production method, since it is assumed that Ni, Co, and Mn are contained, in the formula, $0<y\leq0.4$ and $0<z\leq0.4$ are satisfied).

A nickel salt that is a solute of the nickel salt solution is not particularly limited, and, for example, at least one of nickel sulfate, nickel nitrate, nickel chloride, and nickel acetate can be used.

As a cobalt salt that is a solute of the cobalt salt solution, for example, at least one of cobalt sulfate, cobalt nitrate, cobalt chloride, and cobalt acetate can be used.

As a manganese salt that is a solute of the manganese salt solution, for example, at least one of manganese sulfate, manganese nitrate, manganese chloride, and manganese acetate can be used.

The above-described metal salts are used in ratios corresponding to the composition ratio of $Ni_{1-y-z)}Co_yMn_z(OH)_2$. That is, the amount of each metal salt is specified so that the mole ratio of Ni, Co, and Mn in a mixed solution containing the above-described metal salts corresponds to (1-y-z):y:z in the composition formula (I) of LiMO. In addition, as the solvent, water is used.

The complexing agent is capable of forming a complex with a nickel ion, a cobalt ion, and a manganese ion in an aqueous solution, and examples thereof include ammonium ion donors (ammonium hydroxide, ammonium sulfate, ammonium chloride, ammonium carbonate, ammonium fluoride, and the like), hydrazine, ethylenediaminetetraacetic acid, nitrilotriacetic acid, uracildiacetic acid, and glycine.

In the production step of the metal composite hydroxide, the complexing agent may or may not be used. In a case where the complexing agent is used, regarding the amount of the complexing agent that is contained in the liquid mixture containing the nickel salt solution, a random metal salt solution, and the complexing agent, for example, the mole ratio of the complexing agent to the sum of the mole numbers of the metal salts (a nickel salt and a random metal salt) is more than 0 and 2.0 or less. In the present embodiment, regarding the amount of the complexing agent that is contained in the liquid mixture containing the nickel salt solution, the cobalt salt solution, the manganese salt solution, and the complexing agent, for example, the mole ratio of the complexing agent to the sum of the mole numbers of the metal salts (a nickel salt, a cobalt salt and a manganese salt) is more than 0 and 2.0 or less.

In the co-precipitation method, in order to adjust the pH value of the liquid mixture containing the nickel salt solution, a random metal salt solution, and the complexing agent, an alkali metal hydroxide is added to the liquid mixture before the pH of the liquid mixture turns from alkaline into neutral. The alkali metal hydroxide is, for example, sodium hydroxide or potassium hydroxide.

The value of the pH in the present specification is defined as a value measured when the temperature of the liquid mixture is 40 °C. The pH of the liquid mixture is measured when the temperature of the liquid mixture sampled from a reaction vessel reaches 40 °C. In a case where the sampled liquid mixture is lower than 40 °C, the liquid mixture is heated up to 40 °C and the pH is measured. In a case where the sampled liquid mixture exceeds 40 °C, the pH of the liquid mixture cooled to 40 °C is measured.

When the complexing agent in addition to the nickel salt solution, the cobalt salt solution, and the manganese salt solution is continuously supplied to the reaction vessel, Ni, Co, and Mn react with one another, and $Ni_{(1-y-z)}Co_yMn_z(OH)_2$ is generated.

At the time of the reaction, the temperature of the reaction vessel is controlled within a range of, for example, 20 to 80 °C and preferably 30 to 70 °C or lower.

In addition, at the time of the reaction, the pH value in the reaction vessel is controlled, for example, within a range of 9 to 13 and preferably 10.5 to 12.4. When the pH in the reaction vessel is set to be high, there is a tendency that the tap density of a metal composite hydroxide to be obtained becomes high.

The substances in the reaction vessel are stirred and mixed together. The stirring speed is preferably 100 to 5000 rpm and more preferably 500 to 2000 rpm. When the stirring speed is set to be slow, there is a tendency that the tap density of a metal composite hydroxide to be obtained becomes high.

A reaction precipitate formed in the reaction vessel is neutralized under stirring. The time for the neutralization of the reaction precipitate is preferably 1 to 20 hours and more preferably 5 to 15 hours. When the neutralization time is set to be long, there is a tendency that the tap density of a metal composite hydroxide to be obtained becomes high.

Ammonium sulfate crystals may be injected when the reaction begins. In a case where ammonium sulfate crystals are injected, the amount of the ammonium sulfate crystals injected is preferably more than 0 g and 20 g or less, preferably more than 0 g and 1 g or less, and preferably more than 0 g and 0.5 g or less per 1 L of the volume of the reaction vessel. When ammonium sulfate crystals are injected, there is a tendency that the tap density of a metal composite hydroxide to be obtained becomes low.

As described above, when the pH, stirring speed, and neutralization time in the reaction vessel and the amount of the ammonium sulfate crystals injected are adjusted as appropriate, it is possible to control the tap density of the metal composite hydroxide to 0.60 $g/cm^3$ or more.

As the reaction vessel that is used in the continuous co-precipitation method, it is possible to use a reaction vessel in which the formed reaction precipitate is caused to overflow for separation.

In a case where the metal composite hydroxide is produced by the batch-type co-precipitation method, examples of the reaction vessel include a reaction vessel not equipped with an overflow pipe, a device having a mechanism in which a concentration tank connected to the overflow pipe is provided and a reaction precipitate that has overflown is concentrated in a concentration layer and circulated to the reaction vessel again and the like.

A variety of gases, for example, an inert gas such as nitrogen, argon, or carbon dioxide, an oxidizing gas such as an air or oxygen, or a gas mixture thereof may be supplied into the reaction vessel.

After the above-described reaction, the neutralized reaction precipitate is isolated. For isolation, for example, a method in which a slurry containing the reaction precipitate (co-precipitate slurry) is dehydrated by centrifugation, suction filtration, or the like is used.

The isolated reaction precipitate is washed, dehydrated, dried, and sieved, and a metal composite hydroxide containing Ni, Co and Mn is obtained.

The reaction precipitate is preferably washed with water or an alkaline washing liquid. In the present embodiment, the co-precipitate is preferably washed with an alkaline washing liquid and more preferably washed with a sodium hydroxide solution. In addition, the precursor hydroxide may be washed using a washing liquid containing a sulfur element. As the washing liquid containing a sulfur element, a sulfate aqueous solution of potassium or sodium or the like is an exemplary example.

The tap density of the metal composite hydroxide that is produced as described above is preferably 0.60 g/cm$^3$ or more, more preferably 0.8 g/cm$^3$ or more, and still more preferably 0.9 g/cm$^3$ or more. The tap density of the metal composite hydroxide is preferably 3.0 g/cm$^3$ or less, more preferably 2.0 g/cm$^3$ or less, and still more preferably 1.8 g/cm$^3$ or less. The upper limit value and lower limit value of the tap density of the metal composite hydroxide can be randomly combined together. For example, the tap density of the metal composite hydroxide is preferably 0.60 to 3.0 g/cm$^3$, more preferably 0.8 to 2.0 g/cm$^3$, and still more preferably 0.9 to 1.8 g/cm$^3$.

When a metal composite hydroxide having a tap density of 0.60 g/cm$^3$ or more is used, it is possible to control the $L/D_{50}$ of LiMO to be produced and the $L/D_{10}$ of LiMO to be produced within the preferable ranges of the present embodiment.

Here, the tap density corresponds to the tap bulk density in JIS R 1628-1997.

Next, the metal composite hydroxide is heated to produce a metal composite oxide. Specifically, the metal composite hydroxide is heated at 400 to 700 °C. If necessary, a plurality of heating steps may be carried out. The heating temperature in the present specification means the set temperature of a heating device. In the case of having a plurality of heating steps, the heating temperature means the temperature when the metal composite hydroxide is heated at the highest holding temperature among individual heating step.

The heating temperature is preferably 400 to 700 °C and more preferably 450 to 680 °C. When the heating temperature is lower than 400 °C, there is a concern that the metal composite hydroxide may not be sufficiently oxidized. That is, when the heating temperature is 400 °C or higher, the metal composite hydroxide is sufficiently oxidized. When the heating temperature exceeds 700 °C, there is a concern that the metal composite hydroxide may be excessively oxidized and the BET specific surface area of the metal composite oxide may become too small. That is, when the heating temperature is 700 °C or lower, the metal composite hydroxide is appropriately oxidized, and the BET specific surface area of the metal composite oxide does not become too small.

The time during which the metal composite hydroxide is held at the heating temperature is, for example, 0.1 to 20 hours and preferably 0.5 to 10 hours. The temperature rising rate up to the heating temperature is, for example, 50 to 400 °C/hour, and the temperature decrease rate from the heating temperature to room temperature is, for example, 10 to 400 °C/hour. In addition, as the heating atmosphere, it is possible to use the atmosphere, oxygen, nitrogen, argon or a gas mixture thereof.

The use of the metal composite oxide obtained by adjusting the heating temperature and the holding time to the above-described ranges makes it possible to control the $L/D_{50}$ of LiMO that is produced, the crystallite diameter A of LiMO, and the B/A, which is the ratio of the crystallite diameter B to the crystallite diameter A of LiMO, within the preferable ranges of the present embodiment.

The inside of the heating device may have an appropriate oxygen-containing atmosphere. The oxidizing atmosphere may be an oxygen-containing atmosphere formed by mixing an oxidizing gas into an inert gas or an oxidizing agent may be present in an inert gas atmosphere. When the inside of the heating device is an appropriate oxidizing atmosphere, a transition metal that is contained in the metal composite hydroxide is appropriately oxidized, which makes it easy to control the form of the metal composite oxide.

As oxygen or the oxidizing agent in the oxidizing atmosphere, a sufficient number of oxygen atoms need to be present in order to oxidize the transition metal.

In a case where the oxidizing atmosphere is an oxygen-containing atmosphere, the atmosphere in the reaction vessel can be controlled by a method in which an oxidizing gas is bubbled or the like in the liquid mixture that aerates the oxidizing gas into the reaction vessel.

As the oxidizing agent it is possible to use a peroxide such as hydrogen peroxide, a peroxide salt such as permanganate, perchloric acid, hypochlorous acid, nitric acid, halogen, ozone, or the like.

(2) Mixing of Metal Composite Oxide and Lithium Compound

The present step is a step of mixing a lithium compound and the metal composite oxide to obtain a mixture.

As the lithium compound that is used in the present embodiment, it is possible to use any one of lithium carbonate, lithium nitrate, lithium acetate, lithium hydroxide, lithium oxide, lithium chloride, and lithium fluoride or a mixture of two or more thereof. Among these, any one or both of lithium hydroxide and lithium carbonate are preferable.

In addition, in a case where lithium hydroxide contains lithium carbonate, the content of lithium carbonate in lithium hydroxide is preferably 5 mass % or less.

The method for mixing the metal composite oxide and the lithium compound will be described.

The metal composite oxide is dried and then mixed with the lithium compound. After dried, the metal composite oxide may be appropriately classified.

The lithium compound and the metal composite oxide are mixed in consideration of the composition ratio of a final target product. Specifically, the lithium compound and the metal composite oxide are mixed at ratios corresponding to the composition ratio of the composition formula (I). More specifically, the metal atoms that are contained in the metal composite oxide and a lithium salt are mixed so that the mole ratio of Li to the total of the metal atoms becomes more than 1.0. The mole ratio of Li to the total of the metal atoms is preferably 1.05 or more and more preferably 1.10 or more. The mole ratio of Li to the total of the metal atoms is preferably 1.20 or less and more preferably 1.15 or less. The upper limit value and lower limit value of the mole ratio of Li to the total of the metal atoms can be combined. The mixture of the lithium compound and the metal composite oxide is calcined in a subsequent calcining step, whereby LiMO is obtained.

(3) Calcining of Mixture of Metal Composite Oxide and Lithium Compound

In the present embodiment, the mixture of the lithium compound and the metal composite oxide is preferably calcined in the presence of an inert melting agent. The method for producing LiMO using an inert melting agent is also referred to as a flux method.

Calcining of the mixture in the presence of an inert melting agent makes it possible to accelerate the reaction of the mixture. The inert melting agent may remain in LiMO after calcining or may be removed by washing LiMO with a washing liquid or the like. In the present embodiment, the calcined LiMO is preferably washed with pure water, an alkaline washing liquid, or the like. As the alkaline washing liquid, the above-described alkaline washing liquid can be used.

Usually, as the calcining temperature becomes higher, there is a tendency that the average primary particle diameter becomes larger and the BET specific surface area becomes smaller. The calcining temperature may be appropriately adjusted depending on the kind of a transition metal element used and the kinds and amounts of a precipitant and the inert melting agent.

When a metal composite oxide that is obtained by heating a metal composite hydroxide having a tap density of 0.60 $g/cm^3$ or more is used, and the flux method is carried out, it is possible to control both the $L/D_{50}$ of LiMO to be produced and the crystallite diameter A of LiMO within the preferable ranges of the present embodiment.

As the calcining atmosphere, the atmosphere, oxygen, nitrogen, argon, a gas mixture thereof, or the like is used depending on a desired composition, and a plurality of calcining steps is carried out if necessary.

In the present embodiment, the calcining temperature may be set in consideration of the melting point of the inert melting agent, which will be described below and is preferably set in a range of [melting point of inert melting agent −200 °C] or higher and [melting point of inert melting agent+200 °C] or lower.

In the present embodiment, the calcining temperature is not particularly limited, but is, for example, preferably 600 to 1100 °C and more preferably 650 to 1050 °C When the calcining temperature is 600 °C or higher, it is possible to obtain LiMO having a strong crystal structure. In addition, when the calcining temperature is 1100 °C or lower, it is possible to reduce the volatilization of lithium ions on the surfaces of the secondary particles that are contained in LiMO.

In the present specification, the calcining temperature means the temperature of the atmosphere in a calcining furnace and means the highest temperature of the holding temperatures in the present calcining step (hereinafter, referred to as the highest holding temperature in some cases). In the case of the present calcining step having a plurality of heating steps, the calcining temperature means a temperature at the time of heating the precursor and the liquid compound at the highest holding temperature in each of the heating steps.

The upper limit value and lower limit value of the calcining temperature can be randomly combined together.

When the holding time in the calcining is adjusted, it is possible to control the average primary particle diameter of LiMO to be obtained within the preferable range of the present embodiment. Usually, as the holding time becomes longer, there is a tendency that the average primary particle diameter becomes larger and the BET specific surface area becomes smaller. The holding time in the calcining may be appropriately adjusted depending on the kind of a transition metal element used and the kinds and amounts of a precipitant and the inert melting agent.

Specifically, the holding time in the calcining is preferably 3 to 50 hours. When the holding time in the calcining exceeds 50 hours, there is a tendency that the battery performance substantially deteriorates due to the volatilization of lithium ions. That is, when the holding time in the calcining is shorter than 50 hours, it is possible to suppress the deterioration of the battery performance attributed to the volatilization of lithium ions. When the holding time in the calcining is shorter than 3 hours, the development of crystals is poor, and there is a tendency that the battery performance becomes poor. That is, when the holding time in the calcining is 3 hours or longer, the development of crystals becomes favorable, and there is a tendency that the battery performance becomes favorable. It is also effective to perform preliminary calcining before the above-described calcining. The temperature of the preliminary calcining is preferably in a range of 300 to 850 °C, and the preliminary calcining is preferably carried out for 1 to 10 hours.

In the present embodiment, the temperature rising rate in the heating step in which the highest holding temperature is reached is preferably 80 °C/hour or faster, more preferably 100 °C/hour or faster, and particularly preferably 150 °C/hour or faster.

The temperature rising rate in the heating step in which the highest holding temperature is reached is calculated from the time taken while the temperature begins to be raised and then reaches a holding temperature in the calcining device.

The calcining step preferably has a plurality of calcining stages that is carried out at different calcining temperatures. For example, the calcining step preferably has a first calcining stage and a second calcining stage of calcining the metal composite oxide and the lithium compound at a higher temperature than in the first calcining stage.

Furthermore, the calcining step may have a calcining stage that is carried out at a different calcining temperature for a calcining time.

The inert melting agent that can be used in the present embodiment is not particularly limited as long as the inert melting agent does not easily react with the mixture during the calcining. In the present embodiment, one or more selected from the group consisting of a fluoride of one or more elements selected from the group consisting of Na, K, Rb, Cs, Ca, Mg, Sr, and Ba (hereinafter, referred to as "M"), a chloride of M, a carbonate of M, a sulfate of M, a nitrate of M, a phosphate of M, a hydroxide of M, a molybdate of M, and a tungstate of M are exemplary examples.

As the fluoride of M, NaF (melting point: 993 °C), KF (melting point: 858 °C), RbF (melting point: 795 °C), CsF (melting point: 682 °C), $CaF_2$ (melting point: 1402 °C), $MgF_2$ (melting point: 1263 °C), $SrF_2$ (melting point: 1473 °C), and $BaF_2$ (melting point: 1355 °C) can be exemplary examples.

As the chloride of M, NaCl (melting point: 801 °C), KCl (melting point: 770 °C), RbCl (melting point: 718 °C), CsCl (melting point: 645 °C), $CaCl_2$ (melting point: 782 °C), $MgCl_2$ (melting point: 714 °C), $SrCl_2$ (melting point: 857 °C), and $BaCl_2$ (melting point: 963 °C) can be exemplary examples.

As the carbonate of M, $Na_2CO_3$ (melting point: 854 °C), $K_2CO_3$ (melting point: 899 °C), $Rb_2CO_3$ (melting point: 837 °C), $Cs_2CO_3$ (melting point: 793 °C), $CaCO_3$ (melting point: 825 °C), $MgCO_3$ (melting point: 990 °C), $SrCO_3$ (melting point: 1497 °C), and $BaCO_3$ (melting point: 1380 °C) can be exemplary examples.

As the sulfate of M, $Na_2SO_4$ (melting point: 884 °C), $K_2SO_4$ (melting point: 1069 °C), $Rb_2SO_4$ (melting point: 1066 °C), $Cs_2SO_4$ (melting point: 1005 °C), $CaSO_4$ (melting point: 1460 °C), $MgSO_4$ (melting point: 1137 °C), $SrSO_4$ (melting point: 1605 °C), and $BaSO_4$ (melting point: 1580 °C) can be exemplary examples.

As the nitrate of M, $NaNO_3$ (melting point: 310 °C), $KNO_3$ (melting point: 337 °C), $RbNO_3$ (melting point: 316 °C), $CsNO_3$ (melting point: 417 °C), $Ca(NO_3)_2$ (melting point: 561 °C), $Mg(NO_3)_2$, $Sr(NO_3)_2$ (melting point: 645 °C), and $Ba(NO_3)_2$ (melting point: 596 °C) can be exemplary examples.

As the phosphate of M, $Na_3PO_4$, $KPO_4$ (melting point: 1340 °C), $Rb_3PO_4$, $Cs_3PO_4$, $Ca_3(PO_4)_2$, $Mg_3(PO_4)_2$, (melting point: 1184 °C), $Sr_3(PO_4)_2$ (melting point: 1727 °C), and $Ba_3(PO_4)_2$ (melting point: 1767 °C) can be exemplary examples.

As the hydroxide of M, NaOH (melting point: 318 °C), KOH (melting point: 360 °C), RbOH (melting point: 301 °C), CsOH (melting point: 272 °C), $Ca(OH)_2$ (melting point: 408 °C), $Mg(OH)_2$ (melting point: 350 °C), $Sr(OH)_2$ (melting point: 375 °C), and $Ba(OH)_2$ (melting point: 853 °C) can be exemplary examples.

As the molybdate of M, $Na_2MoO_4$ (melting point: 698 °C), $K_2MoO_4$ (melting point: 919 °C), $Rb_2MoO_4$ (melting point: 958 °C), $Cs_2MoO_4$ (melting point: 956 °C), $CaMoO_4$ (melting point: 1520 °C), $MgMoO_4$ (melting point: 1060 °C), $SrMoO_4$ (melting point: 1040 °C), and $BaMoO_4$ (melting point: 1460 °C) can be exemplary examples.

As the tungstate of M, $Na_2WO_4$ (melting point: 687 °C), $K_2WO_4$, $Rb_2WO_4$, $Cs_2WO_4$, $CaWO_4$, $MgWO_4$, $SrWO_4$, and $BaWO_4$ can be exemplary examples.

In the present embodiment, it is also possible to use two or more of these inert melting agents. In the case of using two or more inert melting agents, there are also cases where the melting point decreases. In addition, among these inert melting agents, as an inert melting agent for obtaining LiMO having higher crystallinity, any of the carbonate of M, the sulfate of M, and the chloride of M or a combination thereof is preferable. In addition, M is preferably any one or both of sodium (Na) and potassium (K). That is, among the above-described inert melting agents, a particularly preferable inert melting agent is one or more selected from the group consisting of NaOH, KOH. NaCl, KCl, $Na_2CO_3$, $K_2CO_3$, $Na_2SO_4$, and $K_2SO_4$.

In the present embodiment, $K_2CO_3$ or $K_2SO_4$ is preferable as the inert melting agent.

In the present embodiment, the amount of the inert melting agent used during the calcining may be appropriately adjusted. Regarding the amount of the inert melting agent used during the calcining, the amount of the inert melting agent to the total amount of the lithium compound and the inert melting agent (mole ratio) is preferably 0.010 to 30 mol %, more preferably 0.015 to 20 mol %, and still more preferably 0.020 to 15 mol % or less.

LiMO of the present embodiment can be produced by the above-described (1) to (3). In addition to the operations (1) to (3), the following operations may be further carried out.

In the present embodiment, the calcined LiMO is preferably crushed, for example, for a range of 10 minutes or longer and 2 hours or shorter. In the present embodiment, LiMO can be crushed using, for example, a mortar, a pin mill, a masscolloider, or the like.

The inert melting agent remaining on the crushed LiMO may be washed. For the washing, pure water or an alkaline washing liquid can be used. As the alkaline washing liquid, for example, aqueous solutions of one or more anhydrides selected from the group consisting of lithium hydroxide, sodium hydroxide, potassium hydroxide, lithium carbonate, sodium carbonate, potassium carbonate, and ammonium carbonate and a hydrate thereof can be exemplary examples. In addition, as an alkali, ammonia can also be used.

The temperature of the washing liquid that is used for the washing is preferably 15 °C or lower, more preferably 10 °C or lower, and still more preferably 8 °C or lower.

When the temperature of the washing liquid is controlled within the above-described range to an extent that the washing liquid does not freeze, it is possible to suppress the excessive elution of lithium ions from the crystal structure of LiMO into the washing liquid during the washing.

As a method for bringing the washing liquid and LiMO into contact with each other in the washing, a method in which LiMO is injected into an aqueous solution of each washing liquid and stirred is an exemplary example. In addition, a method in which an aqueous solution of each washing liquid is sprayed to LiMO as a shower water may also be used. Furthermore, a method in which LiMO is injected into an aqueous solution of the washing liquid and stirred, then, LiMO is separated from the aqueous solution of each washing liquid, and then the aqueous solution of each washing liquid is sprayed to the separated LiMO as a shower water may also be used.

In the washing, it is preferable to bring the washing liquid and LiMO into contact with each other for an appropriate range of time. “Appropriate time” in the washing refers to a time long enough to disperse each particle of LiMO while removing the inert melting agent remaining on the surface of LiMO. The washing time is preferably adjusted depending on the aggregation state of LiMO. The washing time is particularly preferably, for example, in a range of 5 minutes or longer and 1 hour or shorter.

In the present embodiment, after the washing of LiMO, it is preferable to further carry out a heat treatment on LiMO. The temperature or method for carrying out the heat treatment on LiMO is not particularly limited, but is preferably 300 °C or higher, more preferably 350 °C or higher, and still more preferably 400 °C or higher since it is possible to prevent a decrease in the charge capacity. In addition, while not particularly limited, the temperature is preferably 1000 °C or lower and more preferably 950 °C or lower since the volatilization of lithium ions can be prevented and LiMO having the composition of the present embodiment can be obtained.

The amount of lithium ions volatilized can be controlled by the heat treatment temperature.

The upper limit value and lower limit value of the heat treatment temperature can be randomly combined together. For example, the heat treatment temperature is preferably 300 to 1000 °C, more preferably 350 to 950 °C, and still more preferably 400 to 950 °C As the atmosphere during the heat treatment, an oxygen atmosphere, an inert atmosphere, a reduced pressure atmosphere, or a vacuum atmosphere is an exemplary example. When the heat treatment after the washing is carried out in the above-described atmosphere, a reaction between LiMO and moisture or carbon dioxide in the atmosphere during the heat treatment is suppressed, and LiMO containing a few impurities can be obtained.

CAM

CAM of the present embodiment contains LiMO. In CAM of the present embodiment, the content proportion of LiMO in the total mass (100 mass %) of CAM is preferably 70 to 99 mass % and more preferably 80 to 98 mass %.

In the present embodiment, the content proportion of LiMO in the total mass of CAM is observed by irradiating CAM with an electron beam at an acceleration voltage of 20 kV using SEM (for example, JSM-5510 manufactured by JEOL Ltd.). The magnification of a SEM photograph is adjusted to a magnification at which 200 to 400 CAM particles, which are the subject, are present in the SEM photograph. As an example, the magnification may be 1000 to 30000 times.

Lithium Secondary Battery

Next, the configuration of a lithium secondary battery that is suitable in a case where LiMO of the present embodiment is used as CAM will be described.

CAM is preferably composed of LiMO of the present embodiment, but may contain other components as long as the effects of the present invention are not impaired. For example, the content proportion of LiMO of the present embodiment in the total mass (100 mass %) of CAM for the lithium secondary battery is preferably 70 to 99 mass % and more preferably 80 to 98 mass %.

Furthermore, a positive electrode for a lithium secondary battery that is suitable in a case where LiMO of the present embodiment is used as CAM (hereinafter, referred to as the positive electrode in some cases) will be described.

Furthermore, a lithium secondary battery that is suitable for an application of a positive electrode will be described.

An example of the lithium secondary battery that is suitable in a case where LiMO of the present embodiment is used as CAM has a positive electrode, a negative electrode, a separator interposed between the positive electrode and the negative electrode, and an electrolytic solution disposed between the positive electrode and the negative electrode.

An example of the lithium secondary battery has a positive electrode, a negative electrode, a separator interposed between the positive electrode and the negative electrode, and an electrolytic solution disposed between the positive electrode and the negative electrode.

Figure 2:
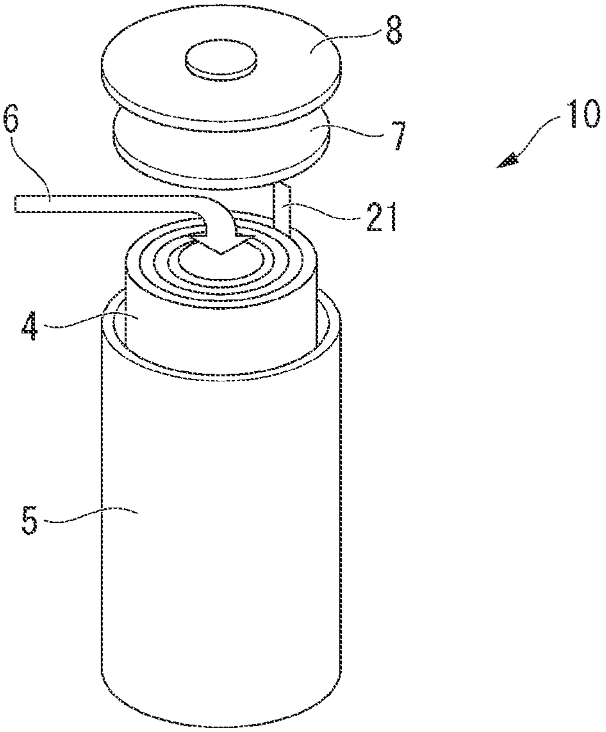
FIG. 2 is a schematic configuration view showing an example of the lithium secondary battery.

FIG. 1 and FIG. 2 are schematic views showing an example of a lithium secondary battery. A cylindrical lithium secondary battery 10 of the present embodiment is produced as described below.

First, as shown in FIG. 1, a pair of separators 1 having a strip shape, a strip-shaped positive electrode 2 having a positive electrode lead 21 at one end, and a strip-shaped negative electrode 3 having a negative electrode lead 31 at one end are laminated in the order of the separator 1, the positive electrode 2, the separator 1, and the negative electrode 3 and are wound to form an electrode group 4.

Next, as shown in FIG. 2, the electrode group 4 and an insulator, not shown, are accommodated in a battery can 5, and the can bottom is then sealed. The electrode group 4 is impregnated with an electrolytic solution 6, and an electrolyte is disposed between the positive electrode 2 and the negative electrode 3. Furthermore, the upper portion of the battery can 5 is sealed with a top insulator 7 and a sealing body 8, whereby the lithium secondary battery 10 can be produced.

As the shape of the electrode group 4, for example, a columnar shape in which the cross-sectional shape becomes a circle, an ellipse, a rectangle, or a rectangle with rounded corners when the electrode group 4 is cut in a direction perpendicular to the winding axis can be an exemplary example.

In addition, as a shape of the lithium secondary battery having the electrode group 4, a shape specified by IEC60086, which is a standard for a battery specified by the International Electrotechnical Commission (IEC), or by JIS C 8500 can be adopted.

For example, shapes such as a cylindrical type and a square type can be exemplary examples.

Furthermore, the lithium secondary battery is not limited to the winding-type configuration and may be a laminate-type configuration in which the laminated structure of the positive electrode, the separator, the negative electrode, and the separator is repeatedly overlaid. As the laminate-type lithium secondary battery, a so-called coin-type battery, button-type battery, or paper-type (or sheet-type) battery can be an exemplary example.

Hereinafter, each configuration will be described in order.

(Positive Electrode)

The positive electrode can be produced by, first, preparing a positive electrode mixture containing CAM, a conductive material, and a binder and supporting the positive electrode mixture by a positive electrode current collector.

(Conductive Material)

As the conductive material in the positive electrode, a carbon material can be used. As the carbon material, graphite powder, carbon black (for example, acetylene black), a fibrous carbon material, and the like can be exemplary examples.

The proportion of the conductive material in the positive electrode mixture is preferably 5 to 20 parts by mass or less with respect to 100 parts by mass of CAM.

(Binder) As the binder in the positive electrode, a thermoplastic resin can be used. As the thermoplastic resin, polyimide resins; fluororesins such as polyvinylidene fluoride (hereinafter, referred to as PVdF in some cases) and polytetrafluoroethylene; polyolefin resins such as polyethylene and polypropylene, and the resins described in WO 2019/098384A1 or US2020/0274158A1 can be exemplary examples.

Two or more of these thermoplastic resins may be used in a mixture form. When a fluororesin and a polyolefin resin are used as the binder, the proportion of the fluororesin in the entire positive electrode mixture is set to 1 mass % or more and 10 mass % or less, and the proportion of the polyolefin resin is set to 0.1 mass % or more and 2 mass % or less, whereby it is possible to obtain a positive electrode mixture having both a high adhesive force to the positive electrode current collector and a high bonding force inside the positive electrode mixture.

(Positive Electrode Current Collector)

As the positive electrode current collector in the positive electrode, a strip-shaped member formed of a metal material such as Al, Ni, or stainless steel as a forming material can be used.

As a method for supporting the positive electrode mixture by the positive electrode current collector, a method in which a paste of the positive electrode mixture is prepared using an organic solvent, the paste of the positive electrode mixture to be obtained is applied to and dried on at least one surface side of the positive electrode current collector, and the positive electrode mixture is fixed by pressing is an exemplary example.

As the organic solvent that can be used in a case where the paste of the positive electrode mixture is prepared, N-methyl-2-pyrrolidone (hereinafter, referred to as NMP in some cases) is an exemplary example.

As a method for applying the paste of the positive electrode mixture to the positive electrode current collector, for example, a slit die coating method, a screen coating method, a curtain coating method, a knife coating method, a gravure coating method, and an electrostatic spraying method are exemplary examples.

The positive electrode can be produced by the method described above.

(Negative Electrode)

The negative electrode in the lithium secondary battery needs to be a material which can be doped with lithium ions and from which lithium ions can be de-doped at a potential lower than that of the positive electrode, and an electrode in which a negative electrode mixture containing a negative electrode active material is supported by a negative electrode current collector and an electrode formed of a negative electrode active material alone can be exemplary examples.

(Negative Electrode Active Material)

As the negative electrode active material in the negative electrode, materials which are a carbon material, a chalcogen compound (oxide, sulfide, or the like), a nitride, a metal, or an alloy and which can be doped with lithium ions and from which lithium ions can be de-doped at a potential lower than that of the positive electrode are exemplary examples.

As the carbon material that can be used as the negative electrode active material, graphite such as natural graphite and artificial graphite, cokes, carbon black, a carbon fiber, and a calcined body of an organic polymer compound can be exemplary examples.

As oxides that can be used as the negative electrode active material, oxides of silicon represented by a formula $SiO_x$ (here, x is a positive real number) such as $SiO_2$ and SiO; oxides of tin represented by a formula $SnO_x$ (here, x is a positive real number) such as $SnO_2$ and SnO; and metal composite oxides containing lithium and titanium or vanadium such as $Li_4Ti_5O_{12}$ and $LiVO_2$ can be exemplary examples.

In addition, as the metal that can be used as the negative electrode active material, lithium metal, silicon metal, tin metal, and the like can be exemplary examples. As a material that can be used as the negative electrode active material, the materials described in WO 2019/098384A1 or US2020/0274158A1 may be used. These metals and alloys are used mainly singly as an electrode after being processed into, for example, a foil shape.

Among the above-described negative electrode active materials, the carbon material containing graphite such as natural graphite or artificial graphite as a main component is preferably used for the reason that the potential of the negative electrode rarely changes (the potential flatness is favorable) from an uncharged state to a fully-charged state during charging, the average discharging potential is low, the capacity retention at the time of repeatedly charging and discharging the lithium secondary battery is high (the cycle characteristics are favorable), and the like. The shape of the carbon material may be, for example, any of a flaky shape such as natural graphite, a spherical shape such as mesocarbon microbeads, a fibrous shape such as a graphitized carbon fiber, or an aggregate of fine powder.

The negative electrode mixture may contain a binder as necessary. As the binder, thermoplastic resins can be exemplary examples, and specifically, PVdF, thermoplastic polyimide, carboxymethylcellulose (hereinafter, referred to as CMC in some cases), styrene-butadiene rubber (hereinafter, referred to as SBR in some cases), polyethylene, and polypropylene can be exemplary examples.

(Negative electrode current collector)

As the negative electrode current collector in the negative electrode, a strip-shaped member formed of a metal material such as Cu, Ni, or stainless steel as the forming material can be an exemplary example.

As a method for supporting the negative electrode mixture by the negative electrode current collector, similar to the case of the positive electrode, a method in which the negative electrode mixture is formed by pressurization and a method in which a paste of the negative electrode mixture is prepared using a solvent or the like, applied or dried on the negative electrode current collector, and then the negative electrode mixture is compressed by pressing are exemplary examples.

(Separator)

As the separator in the lithium secondary battery, it is possible to use, for example, a material that is made of a material such as a polyolefin resin such as polyethylene or polypropylene, a fluororesin, or a nitrogen-containing aromatic polymer and has a form such as a porous film, a non-woven fabric, or a woven fabric. In addition, the separator may be formed using two or more of these materials or the separator may be formed by laminating these materials. In addition, the separators described in JP-A-2000-030686 or US20090111025A1 may be used.

(Electrolytic Solution)

The electrolytic solution in the lithium secondary battery contains an electrolyte and an organic solvent.

As the electrolyte that is contained in the electrolytic solution, lithium salts such as $LiClO_4$ and $LiPF_6$ are exemplary examples, and a mixture of two or more thereof may be used. In addition, the electrolytes described in WO 2019/098384A1 or US2020/0274158A1 may be used.

In addition, as the organic solvent that is contained in the electrolytic solution, for example, carbonates such as propylene carbonate, ethylene carbonate, dimethyl carbonate, diethyl carbonate, and ethyl methyl carbonate can be used. In addition, as the organic solvent that is contained in the electrolytic solution, the organic solvents described in WO2019/098384A1 or US2020/0274158A1 can be used.

As the organic solvent, two or more of these are preferably mixed and used, and a solvent mixture of a cyclic carbonate and an acyclic carbonate and a solvent mixture of a cyclic carbonate and ethers are more preferable.

Furthermore, as the electrolytic solution, it is preferable to use an electrolytic solution containing a lithium salt containing fluorine such as $LiPF_6$ and an organic solvent having a fluorine substituent in order to enhance the safety of the obtained lithium secondary battery.

All-Solid-State Lithium Secondary Battery

Next, a positive electrode for which LiMO according to an aspect of the present invention is used as CAM of an all-solid-state lithium secondary battery and an all-solid-state lithium secondary battery having this positive electrode will be described while describing the configuration of an all-solid-state lithium secondary battery.

Figure 3:
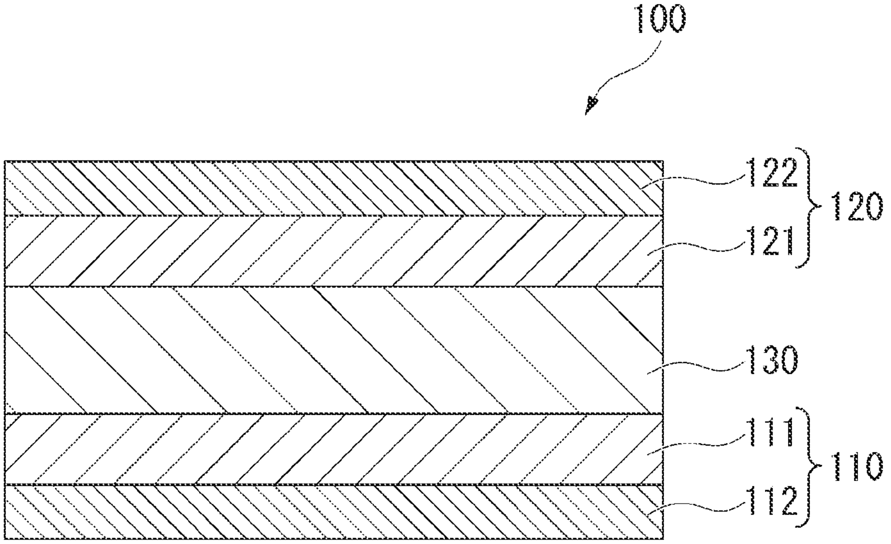
FIG. 3 is a schematic view showing a laminate that an all-solid-state lithium battery of the present embodiment includes.
Figure 4:
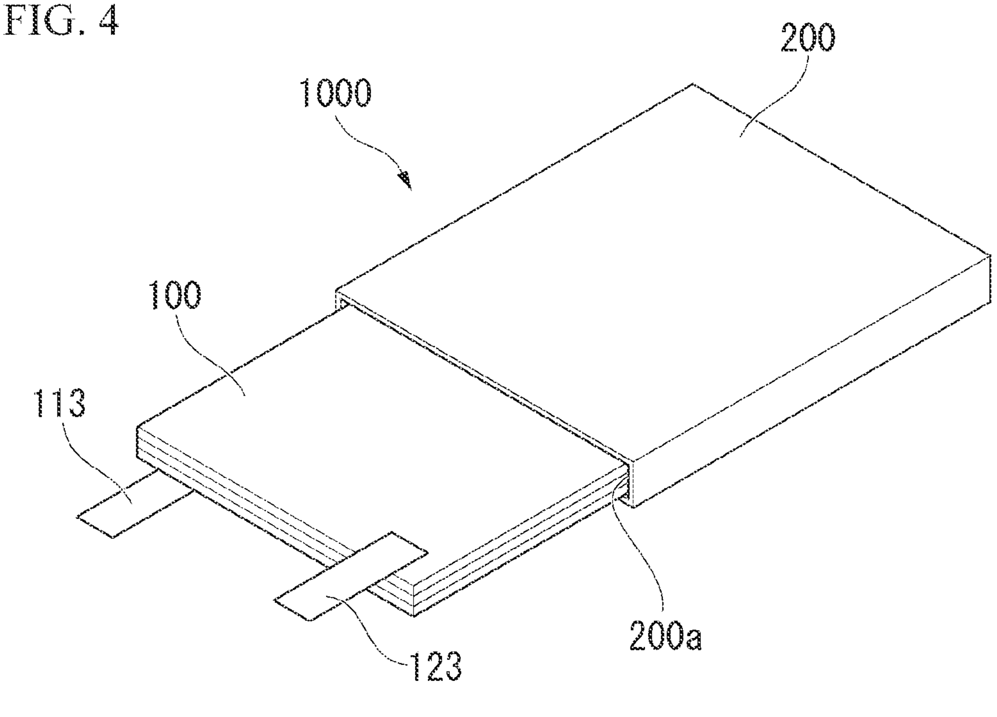
FIG. 4 is a schematic view showing an entire configuration of the all-solid-state lithium battery of the present embodiment.

FIG. 3 and FIG. 4 are schematic views showing an example of an all-solid-state lithium secondary battery of the present embodiment. An all-solid-state lithium secondary battery 1000 shown in FIG. 3 and FIG. 4 has a laminate 100 having a positive electrode 110, a negative electrode 120, and a solid electrolyte layer 130 and an exterior body 200 accommodating the laminate 100. In addition, the all-solid-state lithium secondary battery 1000 may have a bipolar structure in which a positive electrode active material and a negative electrode active material are disposed on both sides of a current collector. As specific examples of the bipolar structure, for example, the structures described in JP-A-2004-95400 are exemplary examples. A material that configures each member will be described below.

The laminate 100 may have an external terminal 113 that is connected to a positive electrode current collector 112 and an external terminal 123 that is connected to a negative electrode current collector 122. In addition, the all-solid-state lithium secondary battery 1000 may have a separator between the positive electrode 110 and the negative electrode 120.

The all-solid-state lithium secondary battery 1000 further has an insulator, not shown, that insulates the laminate 100 and the exterior body 200 from each other and a sealant, not shown, that seals an opening portion 200*a* of the exterior body 200.

As the exterior body 200, a container formed of a highly corrosion-resistant metal material such as aluminum, stainless steel or nickel-plated steel can be used. In addition, as the exterior body 200, a container obtained by processing a laminate film having at least one surface on which a corrosion resistant process has been carried out into a bag shape can also be used.

As the shape of the all-solid-state lithium secondary battery 1000, for example, shapes such as a coin type, a button type, a paper type (or a sheet type), a cylindrical type, a square type, and a laminate type (pouch type) can be exemplary examples.

As an example of the all-solid-state lithium secondary battery 1000, a form in which one laminate 100 is provided is shown in the drawings, but the present embodiment is not limited thereto. The all-solid-state lithium secondary battery 1000 may have a configuration in which the laminate 100 is used as a unit cell and a plurality of unit cells (laminates 100) is sealed inside the exterior body 200.

Hereinafter, each configuration will be described in order.

(Positive Electrode)

The positive electrode 110 of the present embodiment has a positive electrode active material layer 111 and a positive electrode current collector 112.

The positive electrode active material layer 111 contains LiMO, which is one aspect of the present invention described above, and a solid electrolyte. In addition, the positive electrode active material layer 111 may contain a conductive material and a binder.

(Solid Electrolyte)

As the solid electrolyte that is contained in the positive electrode active material layer 111 of the present embodiment, a solid electrolyte that is lithium ion-conductive and used in well-known all-solid-state batteries can be adopted. As such a solid electrolyte, an inorganic electrolyte and an organic electrolyte can be exemplary examples. As the inorganic electrolyte, an oxide-based solid electrolyte, a sulfide-based solid electrolyte, and a hydride-based solid electrolyte can be exemplary examples. As the organic electrolyte, polymer-based solid electrolytes can be exemplary examples. As each electrolyte, the compounds described in WO 2020/208872A1, US2016/0233510A1, US2012/0251871A1, and US2018/0159169A1 are exemplary examples, and examples thereof include the following compounds.

(Oxide-Based Solid Electrolyte)

As the oxide-based solid electrolyte, for example, a perovskite-type oxides, a NASICON-type oxide, a LISICON-type oxide, a garnet-type oxides, and the like are exemplary examples. Specific examples of each oxide include the compounds described in WO 2020/208872A1. US2016/0233510A1, and US2020/0259213A1, and, for example, the following compounds are exemplary examples.

As the garnet-type oxide. Li—La—Zr-based oxides such as $Li_7La_3Zr_2O_{12}$ (also referred to as LLZ) are exemplary examples.

The oxide-based solid electrolyte may be a crystalline material or an amorphous material.

(Sulfide-Based Solid Electrolyte)

As the sulfide-based solid electrolyte, $Li_2S$—$P_2S_5$-based compounds, $Li_2S$—$SiS_2$-based compounds, $Li_2S$—$GeS_2$-based compounds, $Li_2S$—$B_2S_3$-based compounds, $Li_2S$—$P_2O_3$-based compounds, LiI—$Si_2S$—$P_2S_5$-based compounds, LiI—$Li_2S$—$P_2O_5$-based compounds, LiI—$Li_3PO_4$—$P_2S_5$-based compounds, $Li_{10}GeP_2S_{12}$, and the like can be exemplary examples.

In the present specification, the expression "-based compound" that indicates the sulfide-based solid electrolyte is used as a general term for solid electrolytes mainly containing a raw material written before "-based compound" such as "$Li_2S$" or "$P_2S_5$". For example, the $Li_2S$—$P_2S_5$-based compounds include solid electrolytes mainly containing $Li_2S$ and $P_2S_5$ and further containing a different raw material. The proportion of $Li_2S$ that is contained in the $Li_2S$—$P_2S_5$-based compound is, for example, 50 to 90 mass % with respect to the entire $Li_2S$—$P_2S_5$-based compound. The proportion of $P_2S_5$ that is contained in the $Li_2S$—$P_2S_5$-based compound is, for example, 10 to 50 mass % with respect to the entire $Li_2S$—$P_2S_5$-based compound. In addition, the proportion of the different raw material that is contained in the $Li_2S$—$P_2S_5$-based compound is, for example, 0 to 30 mass % with respect to the entire $Li_2S$—$P_2S_5$-based compound. In addition, the $Li_2S$—$P_2S_5$-based compounds also include solid electrolytes containing $Li_2S$ and $P_2S_5$ in different mixing ratios.

As the $Li_2S$—$P_2S_5$-based compounds, $Li_2S$—$P_2S_5$, $Li_2S$—$P_2S_5$—LiI, $Li_2S$—$P_2S_5$—LiCl, $Li_2S$—$P_2S_5$—LiBr, $Li_2S$—$P_2S_5$—LiI—LiBr, and the like can be exemplary examples.

As the $Li_2S$—$SiS_2$-based compounds, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$SiS_2$—$P_2S_5$—LiCl, and the like can be exemplary examples.

As the $Li_2S$—$GeS_2$-based compounds, $L_2S$—$GeS_2$, $Li_2S$—$GeS_2$—$P_2S_5$, and the like can be exemplary examples.

The sulfide-based solid electrolyte may be a crystalline material or an amorphous material.

Two or more solid electrolytes can be jointly used as long as the effect of the invention is not impaired.

(Conductive Material and Binder)

As the conductive material that the positive electrode active material layer 111 of the present embodiment has, the materials described in the above-described (conductive material) can be used. In addition, as for the proportion of the conductive material in the positive electrode mixture, the proportions described in the above-described (conductive material) can be applied in the same manner. In addition, as the binder that the positive electrode has, the materials described in the above-described (binder) can be used.

(Positive Electrode Current Collector)

As the positive electrode current collector 112 that the positive electrode 110 of the present embodiment has, the materials described in the above-described (positive electrode current collector) can be used.

As a method for supporting the positive electrode active material layer 111 by the positive electrode current collector 112, a method in which the positive electrode active material layer 1 is formed by pressurization on the positive electrode current collector 112 is an exemplary example. A cold press or a hot press can be used for the pressurization.

In addition, the positive electrode active material layer 111 may be supported by the positive electrode current collector 112 by preparing a paste of a mixture of CAM, the solid electrolyte, the conductive material, and the binder using an organic solvent to produce a positive electrode mixture, applying and drying the positive electrode mixture to be obtained on at least one surface of the positive electrode current collector 112, and fixing the positive electrode mixture by pressing.

In addition, the positive electrode active material layer 111 may be supported by the positive electrode current collector 112 by preparing a paste of a mixture of CAM, the solid electrolyte, and the conductive material using an organic solvent to produce a positive electrode mixture, applying and drying the positive electrode mixture to be obtained on at least one surface of the positive electrode current collector 112, and calcining the positive electrode mixture.

As the organic solvent that can be used for the positive electrode mixture, the same organic solvent as the organic solvent that can be used in the case of preparing the paste of the positive electrode mixture described in the above-described (positive electrode current collector) can be used.

As a method of applying the positive electrode mixture to the positive electrode current collector 112, the methods described in the above-described section (positive electrode current collector) are exemplary example.

The positive electrode 110 can be produced by the method described above.

(Negative Electrode)

The negative electrode 120 has a negative electrode active material layer 121 and the negative electrode current collector 122. The negative electrode active material layer 121 contains a negative electrode active material. In addition, the negative electrode active material layer 121 may contain a solid electrolyte and a conductive material. As the negative electrode active material, the negative electrode current collector, the solid electrolyte, the conductive material, and a binder, those described above can be used.

As a method for supporting the negative electrode active material layer 121 by the negative electrode current collector 122, similar to the case of the positive electrode 110, a method in which the negative electrode active material layer 121 is formed by pressurization, a method in which a paste-form negative electrode mixture containing a negative electrode active material is applied and dried on the negative electrode current collector 122 and then the negative electrode active material layer 121 is compressed by pressing, and a method in which a paste-form negative electrode mixture containing a negative electrode active material is applied, dried and then calcined on the negative electrode current collector 122 are exemplary examples.

(Solid Electrolyte Layer)

The solid electrolyte layer 130 has the above-described solid electrolyte.

The solid electrolyte layer 130 can be formed by depositing a solid electrolyte of an inorganic substance on the surface of the positive electrode active material layer 111 in the above-described positive electrode 110 by a sputtering method.

In addition, the solid electrolyte layer 130 can be formed by applying and drying a paste-form mixture containing a solid electrolyte on the surface of the positive electrode active material layer 11 in the above-described positive electrode 110. The solid electrolyte layer 130 may be formed by pressing the dried paste-form mixture and further pressurizing the paste-form mixture by a cold isostatic pressure method (CIP).

The laminate 100 can be produced by laminating the negative electrode 120 on the solid electrolyte layer 130 provided on the positive electrode 110 as described above using a well-known method such that the negative electrode electrolyte layer 121 comes into contact with the surface of the solid electrolyte layer 130.

In the lithium secondary battery having the above-described configuration, since LiMO that is produced by the present embodiment described above is used as CAM, it is possible to improve the cycle retention rate of a lithium secondary battery for which this CAM is used.

In addition, since positive electrodes having the above-described configuration have CAM having the above-described configuration, it is possible to improve the cycle retention rates of lithium secondary batteries.

Furthermore, the lithium secondary battery having the above-described configuration has the above-described positive electrode and thus becomes a secondary battery having a high cycle retention rate.

Another aspect of the present invention includes the following aspects.

[14] A lithium metal composite oxide having a layered structure, containing at least Li, Ni, and an element X, in which the $L/D_{50}$ is 0.30 to 1.0, and the A is 480 to 670 Å.

[15] The lithium metal composite oxide according to [14], in which the $L/D_{10}$ is 0.6 to 2.5.

[16] The lithium metal composite oxide according to [14] or [15], in which the L is 2 to 4.5 μm.

[17] The lithium metal composite oxide according to any one of [14] to [16], in which the $D_{50}$ is 3 to 20 μm.

[18] The lithium metal composite oxide according to any one of [14] to [17], in which the BET specific surface area is 0.5 to 1.0 $m^2/g$.

[19] The lithium metal composite oxide according to any one of [14] to [18], in which the B/A is 1.33 to 1.78.

[20] The lithium metal composite oxide according to [19], in which the B is 800 to 1150 Å.

[21] The lithium metal composite oxide according to any one of [14] to [20] that is represented by a composition formula (I).

$$Li[Li_x(Ni_{(1-y-z-w)}Co_yMn_zX1_w)_{1-x}]O_2 \quad (I)$$

In the formula (I), X1 represents one or more elements selected from the group consisting of Mg, Ca, Sr, Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn, and $-0.1 \le x \le 0.2$, $0 \le y \le 0.4$, $0 \le z \le 0.4$, and $0 \le w \le 0.1$ are satisfied.

[22] The lithium metal composite oxide according to [21], in which x in the composition formula (I) satisfies −0.05 to 0.08.

[23] The lithium metal composite oxide according to [21] or [22], in which the composition formula (I) satisfies $0.05 \le y+z+w \le 0.3$.

[24] A positive electrode active material for a lithium secondary battery, containing the lithium metal composite oxide according to any one of [14] to [23].

[25] A positive electrode for a lithium secondary battery, containing the positive electrode active material for a lithium secondary battery according to [24].

[26] A lithium secondary battery having the positive electrode for a lithium secondary battery according to [25].

EXAMPLES

Hereinafter, the present invention will be described in detail by showing examples, but the present invention is not limited to the following description.

Composition Analysis

The composition analysis of LiMO that was produced by a method to be described below was carried out by the above-described method using an inductively coupled plasma emission spectroscopic analyzer (SPS 3000, manufactured by Seiko Instruments Inc.).

Average Primary Particle Diameter

The average primary particle diameter of LiMO was carried out by the above-described method using a scanning electron microscope (SEM, for example, JSM-5510 manufactured by JEOL Ltd.). At the time of SEM observation, the magnification was set to 5000 times so that the number of primary particles in the SEM photograph became 50 to 100.

Measurement of Cumulative Volume Particle Size

The $D_{50}$ and $D_{10}$ of LiMO were measured by the above-described method.

Crystallite Diameter

The crystallite diameter of LiMO was carried out by the above-described method using an X-ray diffractometer (Ultima IV manufactured by Rigaku Co., Ltd.) and integrated powder X-ray analysis software JADE.

Measurement of BET Specific Surface Area

The BET specific surface area of LiMO was measured by the above-described method using a BET specific surface area meter (Macsorb (registered trademark) manufactured by Mountech Co., Ltd.).

Tap Density

The tap density of a metal composite hydroxide was measured by the method described in JIS R 1628-1997.

Production of Positive Electrode for Lithium Secondary Battery

A paste-like positive electrode mixture was prepared by adding LiMO that was obtained by the production method to be described below, acetylene black, which was a conductive material, and PVdF, which was a binder, to achieve a composition of LiMO:conductive material:binder=92:5:3 (mass ratio) and carrying out kneading thereon. During the preparation of the positive electrode mixture, NMP was used as an organic solvent.

The obtained positive electrode mixture was applied to a 40 μm-thick Al foil, which was to serve as a current collector and dried in a vacuum at 150 °C for 8 hours, thereby obtaining a positive electrode for a lithium secondary battery. The electrode 5 area of the positive electrode for a lithium secondary battery was set to 1.65 $cm^2$.

Production of Lithium Secondary Battery (Coin-Type Half Cell)

The following operation was carried out in a glove box under an argon atmosphere.

The positive electrode for a lithium secondary battery produced in the section <Production of positive electrode for lithium secondary battery> was placed on the lower lid of a part for a coin-type battery R2032 (manufactured by Hohsen Corp.) with the aluminum foil surface facing downward, and a laminated film separator (a 16 μm-thick laminate having a heat-resistant porous layer laminated on a polyethylene porous film) was placed on the positive electrode. An electrolytic solution (300 μl) was poured thereinto. As the electrolytic solution, an electrolytic solution obtained by dissolving $LiPF_6$ in a liquid mixture of ethylene carbonate, dimethyl carbonate, and ethyl methyl carbonate in a volume ratio of 16:10:74 so as to be 1.3 mol/L and dissolving 1.0% of vinylene carbonate was used.

Next, lithium metal was used as a negative electrode, and the negative electrode was placed on the upper side of the laminated film separator. An upper lid was placed through a gasket and caulked using a caulking machine, thereby producing a lithium secondary battery (coin-type half cell R2032; hereinafter, referred to as "coin-type half cell" in some cases).

Cycle Test

The cycle retention rate of the lithium secondary battery was carried out under the above-described conditions by the above-described method.

Example 1

1. Production of LiMO-1

After water was poured into a reaction vessel equipped with a stirrer and an overflow pipe, an aqueous solution of sodium hydroxide was added thereto, and the liquid temperature was held at 50 °C.

A nickel sulfate aqueous solution, a cobalt sulfate aqueous solution, and a manganese sulfate aqueous solution were mixed together such that the atomic ratio of Ni, Co, and Mn reached 0.88:0.08:0.04, thereby preparing a raw material-mixed liquid.

Next, the raw material-mixed solution and an ammonium sulfate aqueous solution, as a complexing agent, were continuously added into the reaction vessel under stirring. An aqueous solution of sodium hydroxide was timely added dropwise to 500 L of the solution in the reaction vessel while being stirred at a stirring speed of 750 rpm such that the pH of the solution in the reaction vessel reached 12.4 (measurement temperature: 40 °C). After 12.5 hours, the dropwise addition of the aqueous solution of sodium hydroxide was stopped, and a reaction precipitate was obtained.

The reaction precipitate was washed, then, dehydrated, dried, and sieved, and a metal composite hydroxide containing Ni, Co and Mn was obtained. The tap density of the metal composite hydroxide was 1.56 $g/cm^3$.

The metal composite hydroxide was held and heated at 650 °C for 5 hours in the atmospheric atmosphere and cooled to room temperature, thereby obtaining a metal composite oxide.

Lithium hydroxide was weighed so that the amount (mole ratio) of Li with respect to the total amount of Ni, Co, and Mn that were contained in the metal composite oxide reached 1.1. Potassium sulfate, which was an inert melting agent, was weighed so that the amount (mole ratio) of potassium sulfate with respect to the total amount of potassium sulfate and lithium hydroxide reached 10 mol %. The metal composite oxide, lithium hydroxide, and potassium sulfate were mixed with a mortar to obtain a mixture.

Next, the obtained mixture was held and calcined at 650 °C for 5 hours in an oxygen atmosphere, then, cooled to room temperature and then pulverized.

After that, the mixture was held and calcined at 850 °C for 5 hours in an oxygen atmosphere and then cooled to room temperature, thereby obtaining a calcined substance. The obtained calcined substance was roughly crushed with a roll mill and pulverized with a disc mill (supermasscolloider MKCA6-2J manufactured by Masuko Sangyo Co., Ltd.) with a gap of 100 μm at 1200 rpm so that the $D_{50}$ reached 100 m or less.

After that, furthermore, the calcined substance was injected into a pin mill (impact mill AVIS-100 manufactured by Millsystem Co., Ltd.) operated at a rotation speed of 16000 rpm and crushed, thereby obtaining a crushed powder 1.

The crushed powder was dispersed in pure water at 5 °C and then dehydrated. Furthermore, the powder was washed using pure water adjusted to a liquid temperature of 5 °C, dehydrated, and calcined at 760 °C for 5 hours in an oxygen atmosphere to carry out a heat treatment, thereby obtaining powder-form LiMO-1.

2. Evaluation of LiMO-1

As a result of carrying out the composition analysis of LiMO-1 and comparing the composition with the composition formula (I), x was 0.02, y was 0.08, z was 0.04, and w was 0. Table 1 shows the production conditions of LiMO-1 and the composition ratio of LiMO-1.

Example 2

1. Production of LiMO-2

After water was poured into a reaction vessel equipped with a stirrer and an overflow pipe, an aqueous solution of sodium hydroxide was added thereto, and the liquid temperature was held at 70 °C.

A nickel sulfate aqueous solution, a cobalt sulfate aqueous solution, and a manganese sulfate aqueous solution were mixed together such that the atomic ratio of Ni, Co, and Mn reached 0.91:0.07:0.02, thereby preparing a raw material-mixed liquid.

Next, this raw material-mixed solution was continuously added into the reaction vessel under stirring. An aqueous solution of sodium hydroxide was timely added dropwise to 500 L of the solution in the reaction vessel while being stirred at a stirring speed of 750 rpm such that the pH of the solution in the reaction vessel reached 10.6 (measurement temperature: 40 °C). After 12.5 hours, the dropwise addition of the aqueous solution of sodium hydroxide was stopped, and a reaction precipitate was obtained.

The reaction precipitate was washed, dehydrated, dried, and sieved, and a metal composite hydroxide containing Ni, Co and Mn was obtained. The tap density of the metal composite hydroxide was 1.05 g/cm$^3$.

The metal composite hydroxide was held and heated at 650 °C for 5 hours in an oxygen atmosphere and cooled to room temperature, thereby obtaining a metal composite oxide.

Lithium hydroxide was weighed so that the amount (mole ratio) of Li with respect to the total amount of Ni, Co, and Mn that were contained in the metal composite oxide reached 1.1. Potassium carbonate, which was an inert melting agent, was weighed so that the amount (mole ratio) of potassium carbonate with respect to the total amount of potassium carbonate and lithium hydroxide reached 10 mol %. The metal composite oxide, lithium hydroxide, and potassium sulfate were mixed with a mortar to obtain a mixture.

Next, the obtained mixture was held and calcined at 790 °C for 10 hours in an oxygen atmosphere and then cooled to room temperature, thereby obtaining a calcined substance. The obtained calcined substance was crushed with a mortar, dispersed in pure water (5 °C), and then dehydrated. Furthermore, the powder was washed using pure water adjusted to a liquid temperature of 5 °C, dehydrated, and calcined at 760 °C for 5 hours under an oxygen atmosphere to carry out a heat treatment, thereby obtaining powder-form LiMO-2.

2. Evaluation of LiMO-2

As a result of carrying out the composition analysis of LiMO-2 and comparing the composition with the composition formula (I), x was 0, y was 0.07, z was 0.02, and w was 0. Table 1 shows the production conditions of LiMO-2 and the composition ratio of LiMO-2.

Example 3

1. Production of LiMO-3

After water was poured into a reaction vessel equipped with a stirrer and an overflow pipe, an aqueous solution of sodium hydroxide was added thereto, and the liquid temperature was held at 70 °C.

A nickel sulfate aqueous solution, a cobalt sulfate aqueous solution, a manganese sulfate aqueous solution, and a zirconium sulfate aqueous solution were mixed together such that the atomic ratio of Ni, Co, Mn, and Zr reached 0.905:0.07:0.02:0.005, thereby preparing a raw material-mixed liquid.

Next, this raw material-mixed solution was continuously added into the reaction vessel under stirring. An aqueous solution of sodium hydroxide was timely added dropwise to 15 L of the solution in the reaction vessel while being stirred at a stirring speed of 1500 rpm such that the pH of the solution in the reaction vessel reached 10.6 (measurement temperature: 40 °C). After 12.5 hours, the dropwise addition of the aqueous solution of sodium hydroxide was stopped, and a reaction precipitate was obtained.

The reaction precipitate was washed, dehydrated, dried, and sieved, and a metal composite hydroxide containing Ni, Co, Mn and Zr was obtained. The tap density of the metal composite hydroxide was 0.99 g/cm$^3$.

The metal composite hydroxide was held and heated at 650 °C for 5 hours in an oxygen atmosphere and cooled to room temperature, thereby obtaining a metal composite oxide.

Lithium hydroxide was weighed so that the amount (mole ratio) of Li with respect to the total amount of Ni, Co, Mn, and Zr that were contained in the metal composite oxide reached 1.1. Potassium carbonate, which was an inert melting agent, was weighed so that the amount (mole ratio) of potassium carbonate with respect to the total amount of potassium carbonate and lithium hydroxide reached 10 mol %. The metal composite oxide, lithium hydroxide, and potassium sulfate were mixed with a mortar to obtain a mixture.

Next, the obtained mixture was held and calcined at 820 °C for 10 hours in an oxygen atmosphere and then cooled to room temperature, thereby obtaining a calcined substance. The obtained calcined substance was crushed with a mortar, dispersed in pure water (5 °C), and then dehydrated. Furthermore, the powder was washed using pure water adjusted to a liquid temperature of 5 °C, dehydrated, and calcined at 760 °C for 5 hours under an oxygen atmosphere to carry out a heat treatment, thereby obtaining powder-form LiMO-3.

2. Evaluation of LiMO-3

As a result of carrying out the composition analysis of LiMO-3 and comparing the composition with the composition formula (I), x was 0, y was 0.07, z was 0.02, and w was 0.004. Table 1 shows the production conditions of LiMO-3 and the composition ratio of LiMO-3.

Comparative Example 1

1. Production of LiMO-C1

Using a reaction vessel equipped with a stirrer and an overflow pipe, a concentration tank connected to the overflow pipe, and a device having a mechanism for carrying out circulation from the concentration tank to the reaction vessel, water was put into the reaction vessel, then, an aqueous solution of sodium hydroxide was added, and the liquid temperature was held at 60 °C.

A nickel sulfate aqueous solution, a cobalt sulfate aqueous solution, and a manganese sulfate aqueous solution were mixed together such that the atomic ratio of Ni, Co, and Mn reached 0.88:0.08:0.04, thereby preparing a raw material-mixed liquid.

Next, 30 g of ammonium sulfate crystals with respect to a volume of 1 L of the reaction vessel were injected into the reaction vessel, and this raw material-mixed solution and an ammonium sulfate aqueous solution were continuously added as a complexing agent under stirring. An aqueous solution of sodium hydroxide was timely added dropwise to 15 L of the solution in the reaction vessel while being stirred at a stirring speed of 1500 rpm such that the pH of the solution in the reaction vessel reached 12.5 (measurement temperature: 40 °C). After 26 hours, the dropwise addition of the aqueous solution of sodium hydroxide was stopped, and a reaction precipitate C1 was obtained.

The neutralized reaction precipitate C1 was washed, dehydrated, dried, and sieved, and a metal composite hydroxide C1 containing Ni, Co and Mn was obtained. The tap density of the metal composite hydroxide C1 was 0.36 $g/cm^3$.

The metal composite hydroxide C1 was heated under the same conditions as the heating conditions for the metal composite hydroxide of Example 1, and a metal composite oxide C1 was obtained.

Lithium hydroxide was weighed so that the amount (mole ratio) of Li with respect to the total amount of Ni, Co, Mn, and Zr that were contained in the metal composite oxide reached 1.1. Potassium carbonate, which was an inert melting agent, was weighed so that the amount (mole ratio) of potassium carbonate with respect to the total amount of potassium carbonate and lithium hydroxide reached 10 mol %. The metal composite oxide, lithium hydroxide, and potassium sulfate were mixed with a mortar to obtain a mixture.

Next, the obtained mixture was held and calcined at 790 °C for 10 hours in an oxygen atmosphere and then cooled to room temperature, thereby obtaining a calcined substance. The obtained calcined substance was crushed with a mortar, dispersed in pure water (5 °C), and then dehydrated. Furthermore, the powder was washed using pure water adjusted to a liquid temperature of 5 °C, dehydrated, and calcined at 760 °C for 5 hours under an oxygen atmosphere to carry out a heat treatment, thereby obtaining powder-form LiMO-C1.

2. Evaluation of LiMO-C1

As a result of carrying out the composition analysis of LiMO-C1 and comparing the composition with the composition formula (I), x was −0.01, y was 0.08, z was 0.04, and w was 0. Table 1 shows the production conditions of LiMO-C1 and the composition ratio of LiMO-C1.

Comparative Example 2

1. Production of LiMO-C2

Using a reaction vessel equipped with a stirrer and an overflow pipe, a concentration tank connected to the overflow pipe, and a device having a mechanism for carrying out circulation from the concentration tank to the reaction vessel, water was put into the reaction vessel, then, an aqueous solution of sodium hydroxide was added, and the liquid temperature was held at 60 °C An aqueous solution of nickel sulfate, an aqueous solution of cobalt sulfate, and an aqueous solution of manganese sulfate were mixed so that the atomic ratio of Ni, Co, and Mn was 0.91:0.05:0.04, thereby preparing a raw material-mixed liquid.

Next, 30 g of ammonium sulfate crystals with respect to a volume of 1 L of the reaction vessel were injected into the reaction vessel, and this raw material-mixed solution and an ammonium sulfate aqueous solution were continuously added as a complexing agent under stirring. An aqueous solution of sodium hydroxide was timely added dropwise to 15 L of the solution in the reaction vessel while being stirred at a stirring speed of 1500 rpm such that the pH of the solution in the reaction vessel reached 12.5 (measurement temperature: 40 °C). After 35 hours, the dropwise addition of the aqueous solution of sodium hydroxide was stopped, and a reaction precipitate C2 was obtained.

The neutralized reaction precipitate C1 was washed, dehydrated, dried, and sieved, and a metal composite hydroxide C2 containing Ni, Co and Mn was obtained. The tap density of the metal composite hydroxide C2 was 1.45 $g/cm^3$.

Lithium hydroxide was weighed so that the amount (mole ratio) of Li with respect to the total amount of Ni, Co, and Mn that were contained in the metal composite hydroxide C2 reached 1.2. Potassium sulfate, which was an inert melting agent, was weighed so that the amount (mole ratio) of potassium sulfate with respect to the total amount of potassium sulfate and lithium hydroxide reached 10 mol %. The metal composite hydroxide C2, lithium hydroxide, and potassium sulfate were mixed with a mortar to obtain a mixture.

Next, the obtained mixture was held and calcined at 880 °C for 10 hours in an oxygen atmosphere and then cooled to room temperature, thereby obtaining a calcined substance. The obtained calcined substance was crushed with a mortar, dispersed in pure water (5 °C), and then dehydrated. Furthermore, the powder was washed using pure water adjusted to a liquid temperature of 5 °C, dehydrated, and calcined at 760 °C for 5 hours under an oxygen atmosphere to carry out a heat treatment, thereby obtaining powder-form LiMO-C2.

2. Evaluation of LiMO-C2

As a result of carrying out the composition analysis of LiMO-C2 and comparing the composition with the composition formula (I), x was −0.05, y was 0.05, z was 0.04, and w was 0. Table 1 shows the production conditions of LiMO-C2 and the composition ratio of LiMO-C2.

Comparative Example 3

1. Production of LiMO-C3

Using a reaction vessel equipped with a stirrer and an overflow pipe, a concentration tank connected to the overflow pipe, and a device having a mechanism for carrying out circulation from the concentration tank to the reaction vessel, water was put into the reaction vessel, then, an aqueous solution of sodium hydroxide was added, and the liquid temperature was held at 60 °C A nickel sulfate aqueous solution, a cobalt sulfate aqueous solution, and a manganese sulfate aqueous solution were mixed together such that the atomic ratio of Ni, Co, and Mn reached 0.88:0.08:0.04, thereby preparing a raw material-mixed liquid.

Next, 30 g of ammonium sulfate crystals with respect to a volume of 1 L of the reaction vessel were injected into the reaction vessel, and this raw material-mixed solution and an ammonium sulfate aqueous solution were continuously added as a complexing agent under stirring. An aqueous solution of sodium hydroxide was timely added dropwise to 15 L of the solution in the reaction vessel while being stirred at a stirring speed of 1500 rpm such that the pH of the solution in the reaction vessel reached 12.5 (measurement temperature: 40 °C). After 20 hours, the dropwise addition of the aqueous solution of sodium hydroxide was stopped, and a reaction precipitate C3 was obtained.

The neutralized reaction precipitate C3 was washed, dehydrated, dried, and sieved, and a metal composite hydroxide C3 containing Ni, Co and Mn was obtained. The tap density of the metal composite hydroxide C3 was 0.56 g/cm$^3$.

The metal composite hydroxide C3 was heated under the same conditions as the heating conditions for the metal composite hydroxide of Example 1, and a metal composite oxide C3 was obtained.

Lithium hydroxide was weighed so that the amount (mole ratio) of Li with respect to the total amount of Ni, Co, and Mn that were contained in the metal composite oxide C3 reached 1.1. Potassium carbonate, which was an inert melting agent, was weighed so that the amount (mole ratio) of potassium carbonate with respect to the total amount of potassium carbonate and lithium hydroxide reached 5 mol %. The metal composite oxide C3, lithium hydroxide, and potassium carbonate were mixed with a mortar to obtain a mixture.

Next, the obtained mixture was held and calcined at 790 °C for 10 hours in an oxygen atmosphere and then cooled to room temperature, thereby obtaining a calcined substance. The obtained calcined substance was crushed with a mortar, dispersed in pure water (5 °C), and then dehydrated. Furthermore, the powder was washed using pure water adjusted to a liquid temperature of 5 °C, dehydrated, and calcined at 760 °C for 5 hours under an oxygen atmosphere to carry out a heat treatment, thereby obtaining powder-form LiMO-C3.

2. Evaluation of LiMO-C3

As a result of carrying out the composition analysis of LiMO-C3 and comparing the composition with the composition formula (I), x was 0.04, y was 0.08, z was 0.04, and w was 0. Table 1 shows the production conditions of LiMO-C3 and the composition ratio of LiMO-C3.

TABLE 1

| | x:y:z:w | Tap density of metal composite hydroxide (g/cm$^3$) | Heating temperature of metal composite hydroxide (°C) | Calcining temperature (°C) |
|---|---|---|---|---|
| Example 1 | 0.02:0.08:0.04:0 | 1.56 | 650 | 850 |
| Example 2 | 0:0.07:0.02:0 | 1.05 | 650 | 790 |
| Example 3 | 0:0.07:0.02:0.004 | 0.99 | 650 | 820 |
| Comparative Example 1 | −0.01:0.08:0.04:0 | 0.36 | 650 | 790 |
| Comparative Example 2 | −0.05:0.05:0.04:0 | 1.45 | N/A | 880 |
| Comparative Example 3 | 0.04:0.08:0.04:0 | 0.56 | 650 | 790 |

The average primary particle diameters L, 50% cumulative volume particle sizes $D_{50}$, 10% cumulative volume particle sizes $D_{10}$, $L/D_{50}$, $L/D_{10}$, crystallite diameters A, crystallite diameters B, ratios A/B of the crystallite diameter A to the crystallite diameter B, and BET specific surface areas of LiMO-1 to LiMO-3 of Examples 1 to 3 and LiMO-C1 to LiMO—C3 of Comparative Examples 1 to 3 and the cycle retention rates of the coin-type half cells for which each LiMO was used are shown in Table 2.

TABLE 2

| | Primary particle diameter L (μm) | $D_{50}$ (μm) | $D_{10}$ (μm) | Primary particle diameter $L/D_{50}$ | Primary particle diameter $L/D_{10}$ | Crystallite diameter A (Å) | Crystallite diameter B (Å) | Crystallite diameter B/crystallite diameter A | BET specific surface area | Cycle retention rate (%) |
|---|---|---|---|---|---|---|---|---|---|---|
| Example 1 | 2.76 | 3.73 | 2.28 | 0.72 | 1.21 | 588 | 1032 | 1.76 | 0.69 | 91.0 |
| Example 2 | 2.99 | 5.20 | 3.08 | 0.58 | 0.97 | 622 | 1103 | 1.77 | 0.59 | 84.0 |
| Example 3 | 2.25 | 7.61 | 3.77 | 0.30 | 0.60 | 686 | 1134 | 1.65 | 0.59 | 81.2 |
| Comparative Example 1 | 0.54 | 8.44 | 0.13 | 0.06 | 4.07 | 505 | 866 | 1.72 | 1.95 | 76.7 |
| Comparative Example 2 | 4.90 | 9.33 | 4.99 | 0.53 | 0.98 | 746 | 1388 | 1.86 | 0.29 | 79.6 |
| Comparative Example 3 | 0.45 | 5.42 | 0.13 | 0.08 | 3.51 | 454 | 688 | 1.52 | 2.06 | 79.8 |

As shown in Table 2, when the $L/D_{50}$ of LiMO was 0.3 or more and 1.5 or less and the crystallite diameter A was 700 Å or less as in Examples 1 to 3, the cycle retention rates were 81% or more. In the production methods of Examples 1 to 3, the fact that the tap density of the metal composite hydroxide, which is a precursor of LiMO, is 0.60 g/cm$^3$ or more, the fact that this metal composite hydroxide is heated to produce a metal composite oxide, and the fact that this metal composite oxide is mixed with a lithium compound and calcined in the presence of an inert melting agent are common.

On the other hand, in Comparative Examples 1 and 3 where the $L/D_{50}$ of LiMO was less than 0.3 and Comparative Example 2 where the crystallite diameter A was larger than 700 Å, the cycle retention rates were less than 80%.

In the production methods of Comparative Examples 1 and 3, the tap densities of the metal composite hydroxides, which were precursors of LiMO, were less than 0.60 g/cm$^3$.

In the production method of Comparative Example 2, instead of producing the metal composite oxide by heating the metal composite hydroxide, the metal composite hydroxide was mixed with a lithium compound and calcined. As a result, the $L/D_{50}$ of LiMO reached 0.3 or more, but the crystallite diameter A exceeded 700 Å.

INDUSTRIAL APPLICABILITY

According to the present invention, it is possible to provide a lithium metal composite oxide capable of achieving a high cycle retention rate when used as a positive electrode active material for a lithium secondary battery and a positive electrode active material for a lithium secondary battery, a positive electrode for a lithium secondary battery, and a lithium secondary battery in which the lithium metal composite oxide is used.

REFERENCE SIGNS LIST

1: Separator, 2: Positive electrode, 3: Negative electrode, 4: Electrode group, 5: Battery can, 6: Electrolytic solution, 7: Top insulator, 8: Sealing body, 10: Lithium secondary battery, 21: Positive electrode lead, 31: Negative electrode lead, 100: Laminate, 110: Positive electrode, 111: Positive electrode active material layer, 112: Positive electrode current collector, 113: External terminal, 120: Negative electrode, 121: Negative electrode active material layer, 122: Negative electrode current collector, 123: External terminal, 130: Solid electrolyte layer, 200: Exterior body, **200*a*: Opening portion, 1000**: All-solid-state lithium secondary battery

The invention claimed is:

1. A lithium metal composite oxide having a layered structure, wherein:

the lithium metal composite oxide is represented by a composition formula (I), $$Li[Li_x(Ni_{(1-y-z-w)}Co_yMn_zX1_w)_{1-x}]O_2 \quad (I)$$

in the formula (I), X1 represents one or more elements selected from the group consisting of Mg, Ca, Sr, Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn, and $-0.1 \le x \le 0.2$, $0 \le y \le 0.4$, $0 \le z \le 0.4$, $0 \le w \le 0.1$, and $0 < y+z+w \le 0.3$ are satisfied, $L/D_{50}$, defined as a ratio of an average primary particle diameter L to a 50% cumulative volume particle size $D_{50}$, is 0.72 to 1.5, and in powder X-ray diffraction measurement using a CuKα ray, a crystallite diameter A calculated from a diffraction peak within a range of $2\theta = 44.5 \pm 1°$ is 700 Å or less.

2. The lithium metal composite oxide according to claim 1, wherein $L/D_{10}$ that is a ratio of the average primary particle diameter L to a 10% cumulative volume particle size $D_{10}$ is 0.6 to 3.

3. The lithium metal composite oxide according to claim 2, wherein the average primary particle diameter L is 1 to 10 μm.

4. The lithium metal composite oxide according to claim 2, wherein the 50% cumulative volume particle size $D_{50}$ is 2 to 25 μm.

5. The lithium metal composite oxide according to claim 2, wherein a BET specific surface area is 0.3 to 1.9 $m^2/g$.

6. The lithium metal composite oxide according to claim 2, wherein, in the powder X-ray diffraction measurement using a CuKα ray, when a crystallite diameter calculated from a diffraction peak within a range of $2\theta = 18.5 \pm 1°$ is indicated by B, B/A that is a ratio of the crystallite diameter B to the crystallite diameter A is 1.3 to 1.78.

7. The lithium metal composite oxide according to claim 6, wherein the crystallite diameter B is 1300 Å or less.

8. The lithium metal composite oxide according to claim 1, wherein the average primary particle diameter L is 1 to 10 μm.

9. The lithium metal composite oxide according to claim 1, wherein the 50% cumulative volume particle size $D_{50}$ is 2 to 25 μm.

10. The lithium metal composite oxide according to claim 1, wherein a BET specific surface area is 0.3 to 1.9 $m^2/g$.

11. The lithium metal composite oxide according to claim 1, wherein, in the powder X-ray diffraction measurement using a CuKα ray, when a crystallite diameter calculated from a diffraction peak within a range of $2\theta = 18.5 \pm 1°$ is indicated by B, B/A that is a ratio of the crystallite diameter B to the crystallite diameter A is 1.3 to 1.78.

12. The lithium metal composite oxide according to claim 11, wherein the crystallite diameter B is 1300 Å or less.

13. The lithium metal composite oxide according to claim 1, wherein x in the composition formula (I) satisfies $0 < x \le 0.2$.

14. A positive electrode active material for a lithium secondary battery, comprising:

the lithium metal composite oxide according to claim 1.

15. A positive electrode for a lithium secondary battery, comprising:

the positive electrode active material for a lithium secondary battery according to claim 14.

16. A lithium secondary battery comprising:

the positive electrode for a lithium secondary battery according to claim 15.

* * * * *